(12) United States Patent
Thornycroft et al.

(10) Patent No.: US 12,433,707 B2
(45) Date of Patent: Oct. 7, 2025

(54) SURGICAL ROBOT SYSTEM WITH OPERATOR CONFIGURABLE INSTRUMENT CONTROL PARAMETERS

(71) Applicant: CMR Surgical Limited, Cambridge (GB)

(72) Inventors: Patrick Thornycroft, Cambridge (GB); Matthew Knight, Cambridge (GB)

( * ) Notice: Subject to any disclaimer, the term of this patent is extended or adjusted under 35 U.S.C. 154(b) by 568 days.

(21) Appl. No.: 17/995,819

(22) PCT Filed: Apr. 8, 2021

(86) PCT No.: PCT/GB2021/050868
§ 371 (c)(1),
(2) Date: Oct. 7, 2022

(87) PCT Pub. No.: WO2021/205178
PCT Pub. Date: Oct. 14, 2021

(65) Prior Publication Data
US 2023/0149105 A1   May 18, 2023

(30) Foreign Application Priority Data
Apr. 8, 2020   (GB) ..................................... 2005244

(51) Int. Cl.
*A61B 34/37* (2016.01)
*A61B 18/14* (2006.01)
(Continued)

(52) U.S. Cl.
CPC .......... *A61B 34/37* (2016.02); *A61B 18/1445* (2013.01); *A61B 34/74* (2016.02);
(Continued)

(58) Field of Classification Search
CPC .......... A61B 34/37; A61B 34/74; A61B 34/77
See application file for complete search history.

(56) References Cited

U.S. PATENT DOCUMENTS

2011/0295248 A1   12/2011   Wallace
2012/0239020 A1    9/2012   Cunningham
(Continued)

FOREIGN PATENT DOCUMENTS

EP   3505124 A1   7/2019
WO   2019032309 A2   2/2019
(Continued)

OTHER PUBLICATIONS

International Search Report and Written Opinion PCT Application No. PCT/GB2021/050868 Date of Mailing: Oct. 11, 2021 (24 pages).
(Continued)

*Primary Examiner* — Sean W Collins
(74) *Attorney, Agent, or Firm* — Finch & Maloney PLLC

(57) ABSTRACT

A surgical robot system comprising: a surgical robot, the surgical robot comprising a base, and an arm extending from the base to an attachment for an instrument the arm comprising a plurality of joints whereby the configuration of the arm can be altered; an instrument attached to the arm of the surgical robot; and a control unit configured to receive one or more inputs from an operator of the surgical robot in relation to movement of the instrument and translate the one or more inputs into one or more control signals in accordance with a set of control parameters to control the movement of the instrument, the set of control parameters being one of one or more sets of control parameters associated with the operator.

33 Claims, 8 Drawing Sheets

(51) Int. Cl.
*A61B 34/00* (2016.01)
*A61B 17/00* (2006.01)
*A61B 18/00* (2006.01)
*A61B 34/30* (2016.01)

(52) U.S. Cl.
CPC ..... *A61B 34/77* (2016.02); *A61B 2017/00115* (2013.01); *A61B 2018/00589* (2013.01); *A61B 2018/00601* (2013.01); *A61B 2018/00607* (2013.01); *A61B 2018/0063* (2013.01); *A61B 2018/00696* (2013.01); *A61B 2018/00702* (2013.01); *A61B 2018/00726* (2013.01); *A61B 2018/00732* (2013.01); *A61B 2018/00767* (2013.01); *A61B 2018/00773* (2013.01); *A61B 2018/00875* (2013.01); *A61B 2034/258* (2016.02); *A61B 2034/301* (2016.02)

(56) References Cited

U.S. PATENT DOCUMENTS

| | | | |
|---|---|---|---|
| 2018/0049798 A1* | 2/2018 | Shelton, IV | ... A61B 17/320068 |
| 2019/0059929 A1 | 2/2019 | Shelton, IV | |
| 2019/0059985 A1 | 2/2019 | Shelton | |
| 2019/0201081 A1 | 7/2019 | Shelton, IV | |
| 2020/0060773 A1 | 2/2020 | Barral | |
| 2020/0078105 A1* | 3/2020 | Itkowitz | ................. A61G 13/02 |
| 2020/0078121 A1 | 3/2020 | Richmond | |
| 2020/0409477 A1* | 12/2020 | Tabandeh | ............... B25J 13/025 |
| 2021/0045827 A1* | 2/2021 | Asadian | ................. A61B 90/06 |

FOREIGN PATENT DOCUMENTS

| | | |
|---|---|---|
| WO | 2019117926 A1 | 6/2019 |
| WO | 2019164995 A1 | 8/2019 |

OTHER PUBLICATIONS

Search Report for GB Application No. GB2005244.5 Date of Mailing Sep. 21, 2020 (4 pages).
Search Report for GB Application No. GB2105030.7 Date of Mailing Sep. 3, 2021 (4 pages).

* cited by examiner

SURGICAL ROBOT SYSTEM WITH OPERATOR CONFIGURABLE INSTRUMENT CONTROL PARAMETERS

CROSS-REFERENCE TO RELATED APPLICATIONS

This application claims priority under 35 U.S.C. § 371 as a national stage application of PCT Application No. PCT/GB2021/050868, filed Apr. 8, 2021, which claims priority to GB 2005244.5, filed Apr. 8, 2020, each of which is hereby incorporated herein by reference in its entirety.

BACKGROUND

It is known to use robots for assisting and performing surgery. FIG. 1 illustrates a typical surgical robot 100 which consists of a base 108, an arm 102, and an instrument 105. The base supports the robot, and is itself attached rigidly to, for example, the operating theatre floor, the operating theatre ceiling or a trolley. The arm extends between the base and the instrument. The arm is articulated by means of multiple flexible joints 103 along its length, which are used to locate the surgical instrument in a desired location relative to the patient. The surgical instrument is attached to the distal end 104 of the robot arm. The surgical instrument penetrates the body of the patient 101 at a port 107 so as to access the surgical site. At its distal end, the instrument comprises an end effector 106 for engaging in a medical procedure.

Some surgical procedures may require several surgical robots, each one carrying an instrument or other implement which is used concurrently with the others at the surgical site. FIG. 2 illustrates a surgical robot system 200 with multiple robots 202, 204, 206 operating in a common workspace on a patient 208. For example, surgical robots are often used in endoscopic surgery (e.g. laparoscopic surgery), which also may be referred to as minimally invasive surgery. As is known to those of skill in the art, during an endoscopic procedure the surgeon inserts an endoscope through a small incision or natural opening in the body, such as, but not limited to, the mouth or nostrils. An endoscope is a rigid or flexible tube with a tiny camera attached thereto that transmits real-time images to a video monitor that the surgeon uses to help guide his tools through the same incision/opening or through a different incision/opening. The endoscope allows the surgeon to view the relevant area of the body in detail without having to cut open and expose the relevant area. This technique allows the surgeon to see inside the patient's body and operate through a much smaller incision than would otherwise be required for traditional open surgery. Accordingly, in a typical robotic endoscopic surgery there is an endoscope attached to one surgical robot arm and one or more other surgical instruments, such as a pair of pincers and/or a scalpel, attached to one or more other surgical robot arms.

A variety of surgical instruments are known, each adapted to perform a particular surgical function. FIG. 3 illustrates an example surgical instrument 300 for use with a surgical robot (e.g. surgical robot 100). The surgical instrument comprises a base 301 by means of which the surgical instrument connects to the robot arm. A shaft 302 extends between base 301 and articulation 303. Articulation 303 terminates in an end effector 304. In FIG. 3, a pair of serrated jaws are illustrated as the end effector 304. The articulation 303 permits the end effector 304 to move relative to the shaft 302. It is desirable for at least two degrees of freedom to be provided to the motion of the end effector 304 by means of the articulation.

A surgical robot 100, 202, 204, 206 is typically controlled remotely by an operator (e.g. surgeon) via an operator console that may be located in the same room (e.g. operating theatre) as the surgical robot 100, 202, 204, 206 or remotely from it. An example operator console 400 is shown in FIG. 4. The operator console 400 comprises input devices 402, 404 for controlling the state of the surgical robot 100, 202, 204, 206 arm and/or instrument 105, 300 attached thereto. The input devices 402, 404 may be, for example, handgrips or hand controllers (e.g. one for each hand), with one or more buttons thereon, mounted on parallelogram linkages. A control system converts the movement of (and actions performed on/via) the hand controllers into control signals to move the arm joints and/or instrument end effector of the surgical robot. In some cases, the control system is configured to generate control signals to move the arm joints and/or instrument end effector based on the position in space of the hand controllers and their orientation. The operator console 400 also comprises a display 406. The display 406 is arranged to be visible to an operator (e.g. surgeon) operating the input devices 402, 404. The display is used to display a video stream of the surgical site (e.g. a video stream captured by an endoscope, and/or a video stream captured by another camera or microscope (such as those used in open surgery)) and/or other information to aid the operator (e.g. surgeon) in performing the surgery. The display may be two-dimensional (2D) or three-dimensional (3D).

The control system converts the inputs (e.g. movement information, button press information etc.) received from the hand controllers into control signals that control the movement of an instrument end effector based on a mapping between the inputs and movement of the instrument end effector. This mapping may be defined by a set of control parameters. Example control parameters include, but are not limited to: instrument wrist range of motion; instrument speed (e.g. for scissors, how quickly the scissors perform a cut); instrument applied force; and instrument wrist motion gain.

The control parameters for a particular type of instrument are often selected after extensive testing so as to optimize the performance and control of that type of instrument for the average operator (e.g. surgeon). However, the selected control parameters may not be the optimum control parameters for all operators (e.g. surgeons). For example, some actuated instruments, such as a grasper (which may be alternatively referred to as a pincer) comprising a plurality of jaws, may be able to move between an open position and a closed position. The movement of the jaws may be controlled by a special input on the input devices. For example, each input device may have a lever, or another moveable component or a set of components (e.g. a slider which can be moved in a least two directions, or opposing members which can be squished together or brought in close proximity), which when moved in one direction or manner (e.g. pressed inward) causes the jaws to move towards a closed position, and when moved in a different direction or manner (e.g. pressed or pulled outward) causes the jaws to move towards an open position. The position of the lever may be mapped to the position of the jaws of the grasper instrument via one or more control parameters. Some users may to find it difficult to make precise movements with the default control parameters.

Imprecise movements can potentially lead to complications in the procedure. It can also have a negative impact on the surgical robotic system performance. For example, it may reduce the power efficiency of the system, degrade system components and/or instruments. In will be evident to a person of skill in the art that this is an example only and similar problems may arise for other control parameters.

Accordingly, there is a desire for instrument control parameters to be tailored to the operator (e.g. surgeon).

The embodiments described below are provided by way of example only and are not limiting of implementations which solve any or all of the disadvantages of known surgical robot systems and/or methods of controlling a surgical robot system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are surgical robot systems comprising: a surgical robot, the surgical robot comprising a base, and an arm extending from the base to an attachment for an instrument the arm comprising a plurality of joints whereby the configuration of the arm can be altered; an instrument attached to the arm of the surgical robot; and a control unit configured to receive one or more inputs from an operator of the surgical robot in relation to movement of the instrument and translate the one or more inputs into one or more control signals in accordance with a set of control parameters to control the movement of the instrument, the set of control parameters being one of one or more sets of control parameters associated with the operator.

A first aspect provides a surgical robot system comprising: a surgical robot, the surgical robot comprising a base, and an arm extending from the base to an attachment for an instrument, the arm comprising a plurality of joints whereby the configuration of the arm can be altered; an instrument attached to the arm of the surgical robot; and a control unit configured to receive one or more inputs from an operator of the surgical robot in relation to movement of the instrument and translate the one or more inputs into one or more control signals in accordance with a set of control parameters to control the movement of the instrument, the set of control parameters being one of one or more sets of control parameters associated with the operator.

The control unit may be further configured to receive input from the operator identifying the set of control parameters.

The control unit may be further configured to receive input from the operator which causes the control unit to adjust one or more control parameters of the set of control parameters.

The control unit may be further configured to: receive status data indicating a status of the surgical robot system during a procedure; detect events from patterns in the status data in real-time; in response to detecting one of a plurality of events or combinations of events, automatically select a different set of control parameters from the one or more sets of parameters associated with the operator.

At least one of the plurality of events or combinations of events may comprise a particular phase of the procedure.

The status data may comprise one of more of instrument data indicating a status of the instrument; torque information indicating a torque applied to the surgical robot; position information indication a position of the surgical robot arm; and a video stream of a surgical site captured by an endoscope.

The instrument may be an energised instrument and the control unit may be further configured to, in response to receiving an input from the operator to energise the energised instrument, cause a driving energised signal to be provided to the energised instrument that conforms to a set of energising control parameters, the set of energising control parameters being one of one or more sets of energising control parameters associated with the operator.

The energised instrument may be an electrosurgical instrument.

The set of energising control parameters may comprise one or more of: power output as a fraction of load resistance, maximum power output, high frequency voltage form, peak voltage, frequency and duty cycle.

The control unit may be configured to provide a visual indication to the operator of the set of control parameters used to translate the operator inputs.

The visual indication may be provided to the operator on a display used to display a representation of a video stream of a surgical site.

The set of control parameters may comprise: one or more instrument speed parameters, one or more instrument applied force parameters, and/or one or more instrument wrist motion gain parameters.

Each set of control parameters for an instrument may define a relationship between the operator inputs in relation to movement of the instrument and movement of the instrument.

The surgical robot system may further comprise an operator console comprising one or more input devices by which the user can provide the inputs to the control unit.

The surgical robot system may further comprise a graphical user interface configured to allow the operator to modify a set of control parameters associated with the operator.

The graphical user interface may be configured to allow the operator to modify the set of control parameters during a procedure.

The graphical user interface is further configured to allow an operator to add a set of control parameters to the one or more sets of parameters associated with the operator.

The added set of control parameters may have been generated by a different operator.

The graphical user interface may be configured to allow the operator to select the set of control parameters.

A second aspect provides a surgical robot system comprising: a surgical robot, the surgical robot comprising a base, and an arm extending from the base to an attachment for an instrument, the arm comprising a plurality of joints whereby the configuration of the arm can be altered; an energised instrument attached to the arm of the surgical robot; and a control unit configured to, in response to receiving an input from an operator of the surgical robot to energise the energised instrument, cause a driving energised signal to be provided to the energised instrument that conforms to a set of energising control parameters, the set of energising control parameters being one of one or more sets of energising control parameters associated with the operator.

The energised instrument may be an electrosurgical instrument.

The set of energising control parameters may comprise one or more of: power output as a fraction of load resistance, maximum power output, high frequency voltage form, peak voltage, frequency and duty cycle.

The surgical robot system may further comprise an energy generator and the control unit is configured to cause a driving energised signal to be provided to the energised instrument that conforms to the set of energising control parameters by outputting one or more control signals to the energy generator which causes the energy generator to output a driving energised signal that conforms to the set of energising control parameters.

A third aspect provides a surgical robot system comprising: a surgical robot, the surgical robot comprising a base, and an arm extending from the base to an attachment for an instrument, the arm comprising a plurality of joints whereby the configuration of the arm can be altered; an energised instrument attached to the arm of the surgical robot; and a control unit configured to: receive one or more inputs from an operator of the surgical robot in relation to movement of the energised instrument and translate the one or more inputs into one or more control signals in accordance with a set of control parameters to control the movement of the energised instrument; detect energised events in real-time from status data indicating a status of the surgical robot system during a procedure; and in response to detecting one of a plurality of predetermined energised events, automatically adjust at least one control parameter of the set of control parameters.

The energised instrument may be an electrosurgical instrument.

The electrosurgical instrument may comprise one or more grasping elements.

The electrosurgical instrument may be a cut and seal electrosurgical instrument.

The set of control parameters may control a grasping force of the one or more grasping elements of the electrosurgical instrument and the control unit may be configured to, in response to detecting energisation of the electrosurgical instrument, automatically adjust at least one parameter of the set of control parameters so that an optimum grasping force is applied to the one or more grasping elements of the electrosurgical instrument.

The control unit may be configured to determine the optimum grasping force based on one or more of: a type of tissue energy is being applied to; and a type of procedure being performed on the tissue.

The control unit may be configured to, in response to detecting one of the plurality of predetermined energised events, automatically adjust at least one control parameter of the set of control parameters that controls axial movement of the one or more grasping elements.

The control unit may be configured to, in response to detecting energisation of the electrosurgical instrument, automatically adjust at least one control parameter of the set of control parameters to limit the axial movement of the one or more grasping elements.

The set of control parameters may control a velocity of the energised instrument and the control unit may be configured to, in response to detecting energisation of the energised instrument, automatically adjust at least one control parameter of the set of control parameters so as to minimize velocity of the energised instrument.

The control unit may be configured to detect an energising event of the plurality of predetermined energised events when the control unit detects from the status data one of a plurality of predetermined combinations of one or more energising conditions, an energising condition being a condition that affects an energised action performed by the energised instrument.

The one or more energising conditions may comprise one or more of: energising the energised instrument; a type of energised action or task being performed; a type of tissue on which an energised action is being performed; impedance that tissue on which the energised action is being performed provides to electrical current flowing through it; conductance of tissue on which an energised action is being performed; an amount of energy applied to the tissue over time; a duty cycle of a driving energised signal provided to the energised instrument; the peak voltage of the driving energised signal; and a frequency of the driving energised signal.

The control unit may be configured to detect one or more of the one or more energising conditions by monitoring one or more of the driving energised signal provided to the energised instrument and a return energised signal.

The control unit may be configured to detect one or more of the impedance and the conductance of the tissue by monitoring the return energised signal.

The control unit may be further configured to adjust at least one control parameter of the set of control parameters so that the grasping force applied to the one or more grasping elements of the electrosurgical instrument changes as the impedance and/or conductance of the tissue changes.

The control unit may be configured to: in response to detecting energisation of the energised instrument, automatically adjust the at least one control parameter of the set of control parameters; and in response to detecting that the energised instrument is no longer energised, automatically revert back to using the set of control parameters.

The control unit may be further configured to, in response to receiving an input from the operator to energise the energised instrument, cause a driving energised signal to be provided the energised instrument that conforms to a set of energising control parameters, the set of energising control parameters being one of one or more sets of energising control parameters associated with the operator.

The set of control parameters may be one of one or more sets of control parameters associated with the operator.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
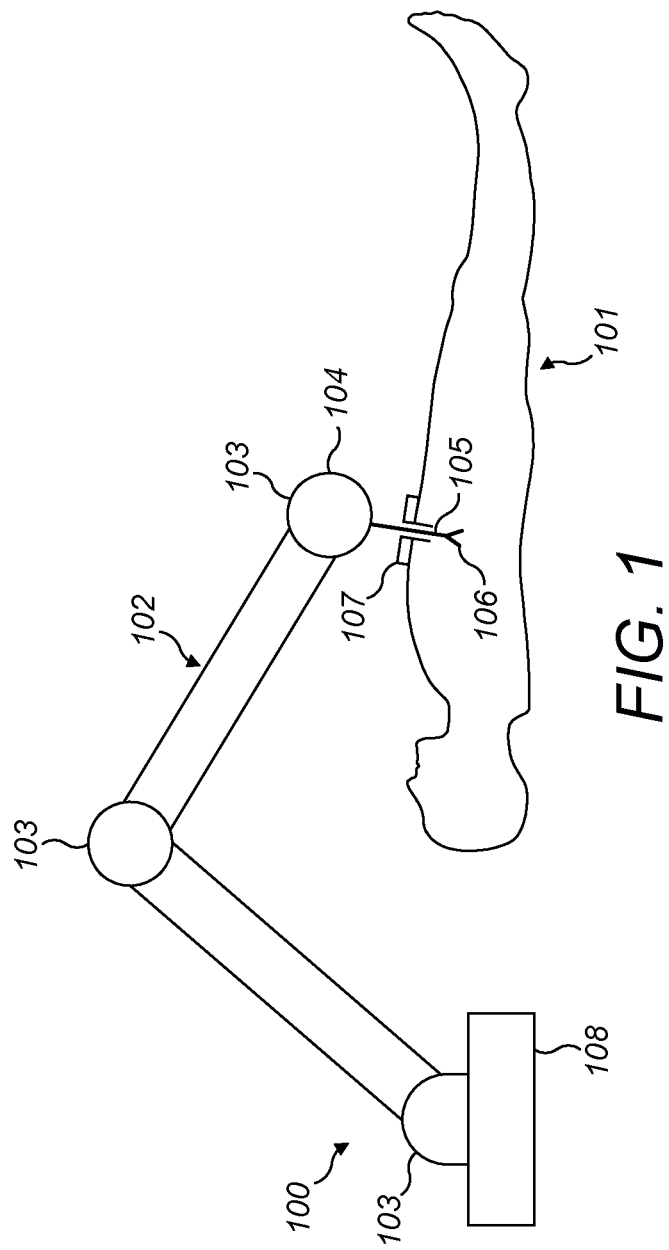
FIG. 1 is a schematic diagram of an example surgical robot performing an example surgical procedure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Described herein are surgical robot systems comprising one or more surgical robots to which surgical instruments can be attached in which a surgical instrument attached to a surgical robot is controlled in accordance with operator-specific control parameters. Specifically, in the systems described herein each surgical robot system operator (e.g. surgeon) of a plurality of operators is associated with one or more sets of control parameters for one or more surgical instruments. A set of control parameters for an instrument defines the relationship between the operator's inputs in relation to the instrument movement and movement of the instrument. Each set of control parameters may have been manually generated by a person (e.g. the operator, another operator or an administrator) or automatically created based on data collected from previous surgical robot procedures. Each set of control parameters for an instrument may be associated with, for example, (i) a surgical procedure; (ii) an individual step or task within a surgical procedure; or (iii) a specified combination of detectable events or conditions.

When an operator of the plurality of operators uses an instrument during a surgical procedure one of the sets of parameters for that instrument from the sets of parameters associated with the operator is selected to be used to convert the operator's inputs in relation to the instrument movement into movement of the instrument. In some cases, a set of control parameters may be selected once at the beginning of a procedure and that set of control parameters may be used throughout the procedure. In other cases, an initial set of control parameters may be selected for the instrument, but the set of control parameters may be manually changed by the operator during the procedure (e.g. another set of control parameters may be selected for a specific task or step of the procedure). In yet other cases, an initial set of control parameters may be selected for the instrument, but the set of control parameter may be automatically changed during the procedure based on one or more detected events or combination of detected events.

Allowing the operator to use operator-defined control parameters for an instrument when controlling that instrument during a procedure may improve the outcome of surgical procedures as it may allow the operator to control the movement of the instrument in a more intuitive and natural way which may improve the performance of the operator. For example, it may allow the operator's inputs to be interpreted more in line with the way the operator expects. Allowing the operator to use operator-defined control parameters may also improve the efficiency of a procedure as it may reduce the wear and tear on an instrument.

Figure 5:
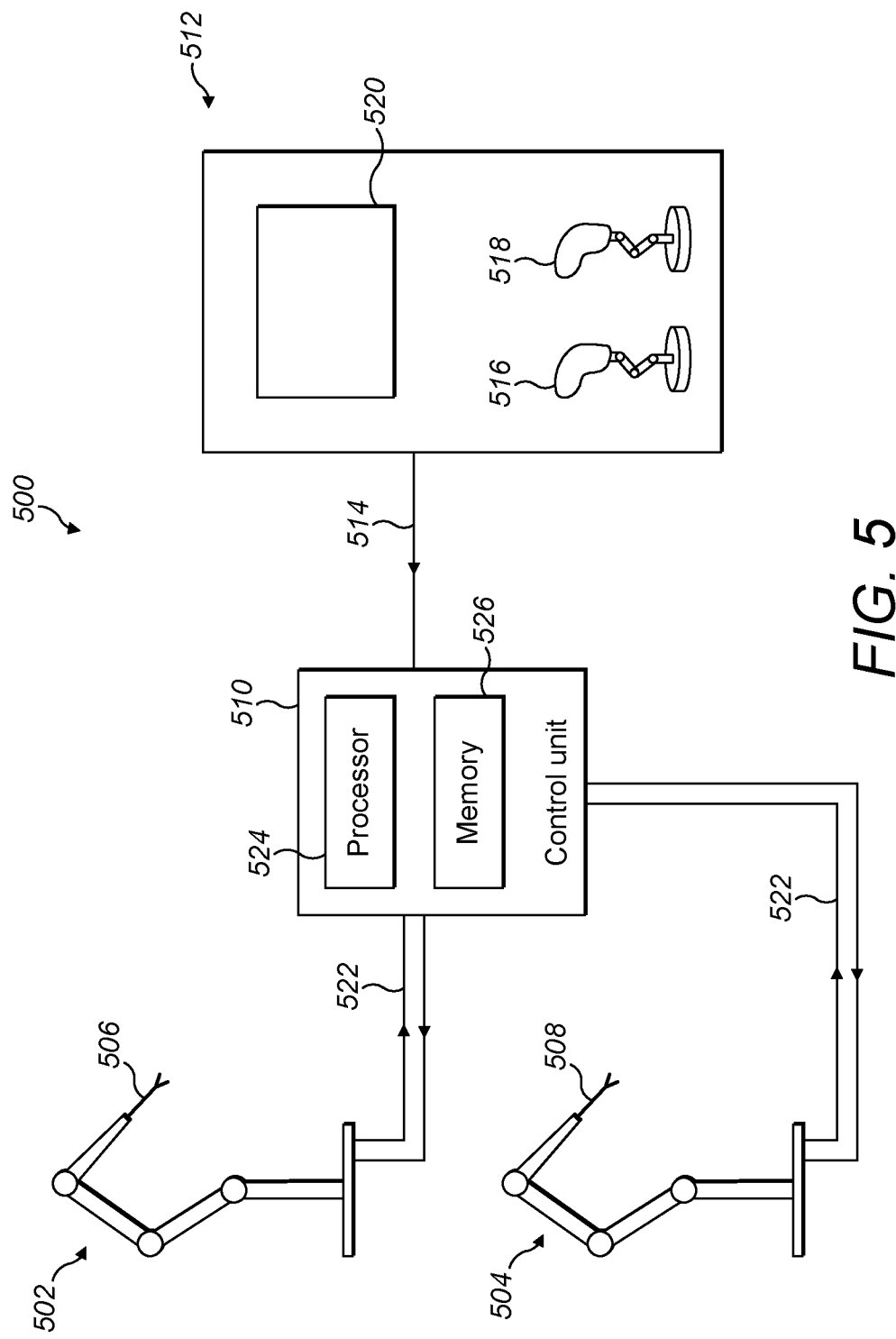
FIG. 5 is a schematic diagram of an example surgical robot system in which the instruments are controlled in accordance with operator-specific control parameters.

Reference is now made to FIG. 5 which illustrates an example surgical robot system 500 in which surgical instruments are controlled in accordance with operator-specific control parameters. The system 500 comprises one or more surgical robots 502, 504; one or more instruments 506, 508 attached to the surgical robots 502, 504; a control unit 510 for driving the surgical robots 502, 504 and the instruments 506, 508 attached thereto; and an operator console 512 which provides inputs 514 to the control unit 510 for driving the surgical robots 502, 504 and the instruments 506, 508 attached thereto.

Each surgical robot 502, 504 comprises a base and an arm extending from the base to an attachment for an instrument. The arm comprises a plurality of joints whereby the configuration of the arm can be altered. An example surgical robot which may be used to implement the surgical robots 502, 504 of FIG. 5 is described below with respect to FIG. 6.

Figure 2:
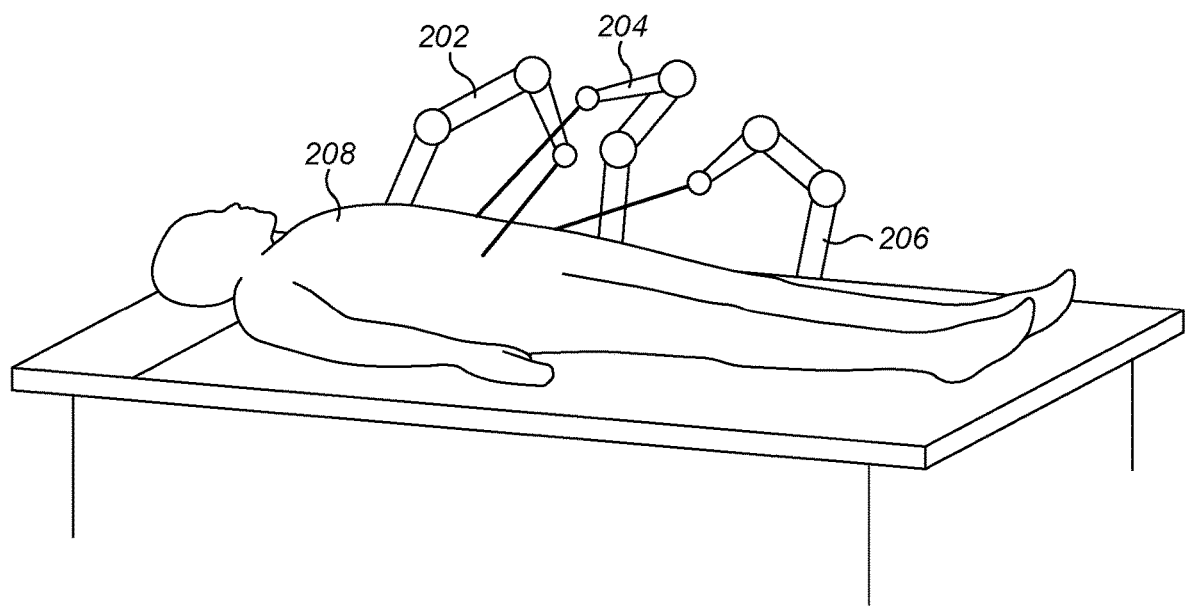
FIG. 2 is a schematic diagram of an example surgical robot system comprising a plurality of surgical robots.
Figure 3:
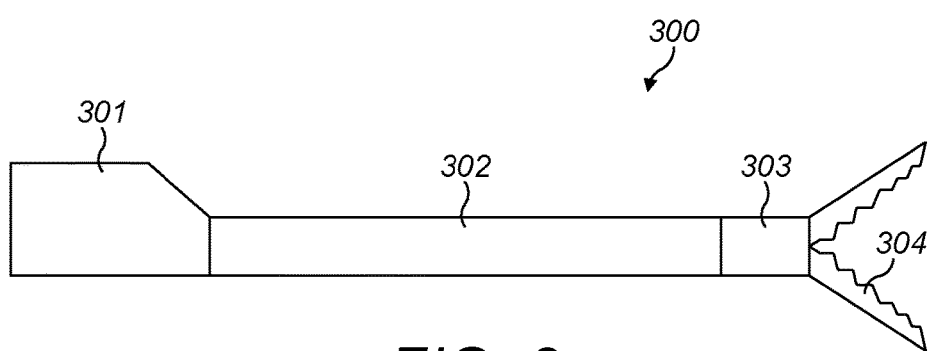
FIG. 3 is a schematic diagram of an example surgical instrument.

Each instrument 506, 508 comprises a base by means of which the surgical instrument 506, 508 connects to the surgical robot 502, 504 arm. A shaft extends between the base and an articulation. The articulation terminations in an end effector. An example surgical instrument which may be attached to a surgical robot, and may be used to implement the instruments 506, 508 of FIG. 5, was described with respect to FIG. 2. A surgical instrument can be any of a plurality of different types, such as, but not limited to, an endoscope, pincers and a scalpel.

Figure 4:
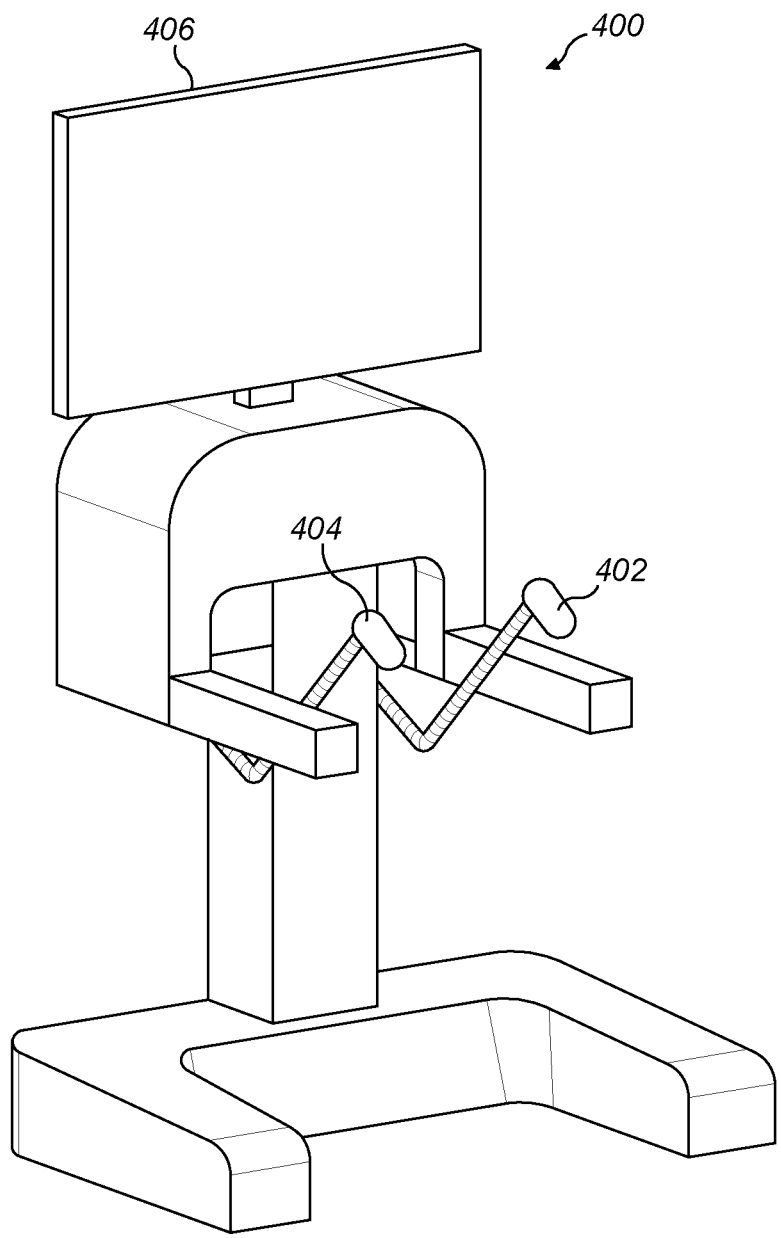
FIG. 4 is a schematic diagram of an example operator console.

The operator console 512 may be located in the same room (e.g. operating theatre) as the surgical robot system 500 or remotely from it. The operator console allows the operator to provide inputs 514 to the control unit 510 to control the movement of a surgical robot 502, 504 and the instrument 506, 508 attached thereto. An operator console may comprise input devices 516, 518 for controlling the state of the surgical robot 502, 504 arms and/or the instruments 506, 508 attached thereto. The input devices 516, 518 may be, for example, handgrips or hand controllers (e.g. one for each hand), with one or more buttons thereon, mounted on parallelogram linkages. The operator console 512 may also comprise a display 520. The display 520 is used to display a video stream of the surgical site (e.g. a video stream captured by an endoscope, and/or a video stream captured another camera or microscope (such as those used in open surgery)) and/or other information to aid the operator (e.g. surgeon) in performing the surgery. An example operator console, which may be used to implement the operator console 512 of FIG. 5, was described with respect to FIG. 4.

The control unit 510 receives inputs 514 from the operator console 512. The inputs may be received from first and second input devices 516, 518 and/or other components of the operator console 512 such as foot pedal(s) inputs, voice recognition inputs, gesture recognition inputs, eye recognition inputs etc. The control unit 510 also receives inputs 522 from the surgical robots 502, 504. These inputs may include sensor data from position sensors and torque sensors located on the robot arm joints. The control unit 510 may also receive other inputs 522 from each surgical robot 502, 504, such as force feedback, data from or about the surgical instruments 506, 508 etc. The control unit 510 drives the surgical robots 502, 504 in response to the inputs 522 it receives from the surgical robots 502, 504 and the operator console 512.

Specifically, the control unit 510 translates inputs 514 received from the operator console 512 that relate to movement of an instrument 506, 508 into a set of control signals to drive the instrument based on a set of control parameters for the instrument. A set of control parameters for an instrument defines the relationship between the operator's inputs related to the instrument movement and movement of the instrument. The control parameters may be described as master-slave mapping parameters as they map one or more inputs received from the master (e.g. the operator/operator console) to one or more inputs sent to the slave (e.g. the surgical robot and instrument). Example control parameters for a robotically controlled surgical instrument include, but are not limited to, instrument wrist range of motion parameters; instrument speed parameters; instrument applied force parameters; instrument wrist motion gain parameters; and instrument roll parameters. Instrument wrist range of motion parameters may control the angular limits of the instrument motion. For example, the instrument range of motion parameters may control how far an instrument can pitch or yaw and/or control the maximum angle of a jaw aperture. Instrument speed parameters may control the maximum speed that an instrument can move in space or its joints can rotate. The instrument applied force parameters may control the maximum force that an instrument can apply, and/or the gain between the position of, for example, the hand controller lever and the position of the jaws. The instrument applied force parameters may also control the increment of force or the decrement of force being applied by the instrument jaws after surpassing a position or force threshold as measured from the control unit 510 or instrument sensors. There may be separate instrument applied force parameters for a closing motion of a set of jaws and an opening motion of a set of jaws. Instrument wrist motion gain parameters may be used to control the gain in movement of the wrist of the robot arm at a particular point with respect to the movement of the hand controllers in space. The instrument wrist motion gain parameters may also be used to control the change in orientation of the particular point with respect to the change in orientation of the hand controller. Specifically, in some cases, the range of motion of an instrument may be larger than the range of motion of the operator's wrist and the operator may be able to have the control unit 510 hold the instrument for a period of time in order to reposition the hand controller in a comfortable pose and get the further instrument wrist movement. The gain may be the same for each direction or different between directions. Instrument roll parameters may control the roll of an instrument about its longitudinal axis (e.g. the axis of the shaft). Specifically, the instrument roll parameters may control how the roll of the instrument about its longitudinal axis correlates to the same movement performed by the operator via the hand controller(s).

In the examples described herein the set(s) of control parameters that are used by the control unit 510 to convert inputs related to movement of an instrument attached to a surgical robot to a set of signals that control the movement of the corresponding instrument are selected based on the operator (e.g. surgeon) controlling the surgical robots 502, 504. Specifically, each operator (e.g. surgeon) of a plurality of operators is associated with one or more sets of control parameters for one or more instrument types; and when an instrument 506, 508 is used in a procedure controlled by a particular operator (e.g. surgeon) the set of control parameters used by the control unit 510 to generate control signals for that instrument (and the related surgical robot) is selected from the sets of parameters associated with the operator. As described in more detail below, each set of control parameters associated with an operator may have been manually generated by a person such as the operator, another operator or an administrator; or automatically generated by a computer system from data related to previous procedures performed using the surgical robotic system or a similar surgical robotic system.

In some cases, the control unit 510 may be configured to use a single set of control parameters for an instrument for the duration of a procedure. The set of control parameters may be manually selected by the operator (e.g. surgeon) from the set of control parameters associated with the operator: prior to the start of the procedure and the control unit 510 configured accordingly; at the start of the procedure using, for example, the operator console; or during the procedure, using, for example the operator console (e.g. before the operator uses an instrument for the first time in the procedure). Alternatively, the set of control parameters for an instrument may be automatically selected by the control unit 510 from the sets of control parameters associated with the relevant operator. For example, in some cases, an operator may be able to link or otherwise associate a set of control parameters for an instrument with a procedure and the control unit 510 may be configured to automatically select a set of control parameters for the relevant type of instrument that is linked to the procedure type.

In other cases, the control unit 510 may be configured to use multiple sets of control parameters for an instrument during the procedure. For example, the control unit 510 may be configured to receive inputs (e.g. from the operator console 512) multiple times during a procedure indicating which set of control parameters of the operator's control parameters are to be used to control a particular instrument. This may allow the operator to develop and store sets of control parameters for different tasks within a procedure. For example, in some cases, an operator may be able to link or associate a set of control parameters for an instrument with a specific task, step or phase of a procedure.

In yet other cases, the control unit 510 may be configured to use multiple sets of control parameters for an instrument during the procedure, but instead of the operator manually identifying (e.g. via the operator console 512) the specific sets of control parameters to be used for an instrument, the control unit 510 is configured to automatically select the sets of control parameters used for an instrument in response to detecting events and/or conditions. Specifically, in these cases the control unit 510 is configured to detect from the inputs received from the surgical robots and, optionally, other inputs, events or conditions during the procedure and may automatically select an initial set of control parameters or a new set of control parameters based on the detected events or conditions. Examples of events or conditions that the control unit 510 may be able to detect include, but are not limited to, the stage of a procedure that is currently being performed. Where, as described above, an operator may be able to link or associate a set of control parameters for an instrument with a specific task or step of a procedure, the control unit 510 may be able to, for each detected task or step of the procedure, select the set of control parameters associated with that task or step. It will be evident to a person of skill in the art that the stage of a procedure is only an example of an event or set of conditions that may be detectable by the control unit 510. A more detailed explanation of the data the control unit 510 may use to detect events and conditions, and which events and conditions may be detected therefrom is described below.

In some cases, the control unit 510 may be able to operate in any of the described modes. For example, the control unit 510 may be able to operate in: a first mode in which a single set of control parameters is used throughout the procedure which is either manually selected or automatically selected; a second mode in which multiple sets of control parameters are manually selected by the operator (e.g. via the operator console) during the procedure (e.g. a different set of control parameters is selected for different tasks or steps during the procedure); and/or a third mode in which different sets of control parameters are automatically selected based on detected events or conditions during the procedure (e.g. the control unit 510 may be able to automatically detect the current stage of the procedure and when the stage changes select an appropriate set of control parameters for the new stage). Where the control unit 510 supports multiple modes of operation the control unit 510 may be able to switch between modes during a procedure. For example, the operator may start the procedure with the control unit 510 operating in the first mode and may then cause the control unit 510 to switch to operating in the third mode.

The control unit 510 may comprise one or more processors 524 and a memory 526. The memory 526 stores, in a non-transient way, software code that can be executed by the one or more processors 524 to control the drivers of the surgical robots. In some cases, the memory 526 may also store the sets of control parameters associated with the current operator, and optionally the sets of control parameters associated with one or more other operators.

While the example surgical robot system 500 of FIG. 5 comprises two surgical robots 502, 504, it will be evident to a person of skill in the art that this is an example only and the methods and techniques described herein are equally applicable to surgical robot systems with only one surgical robot and surgical robot systems with more than two surgical robots.

Surgical Robot

Figure 6:
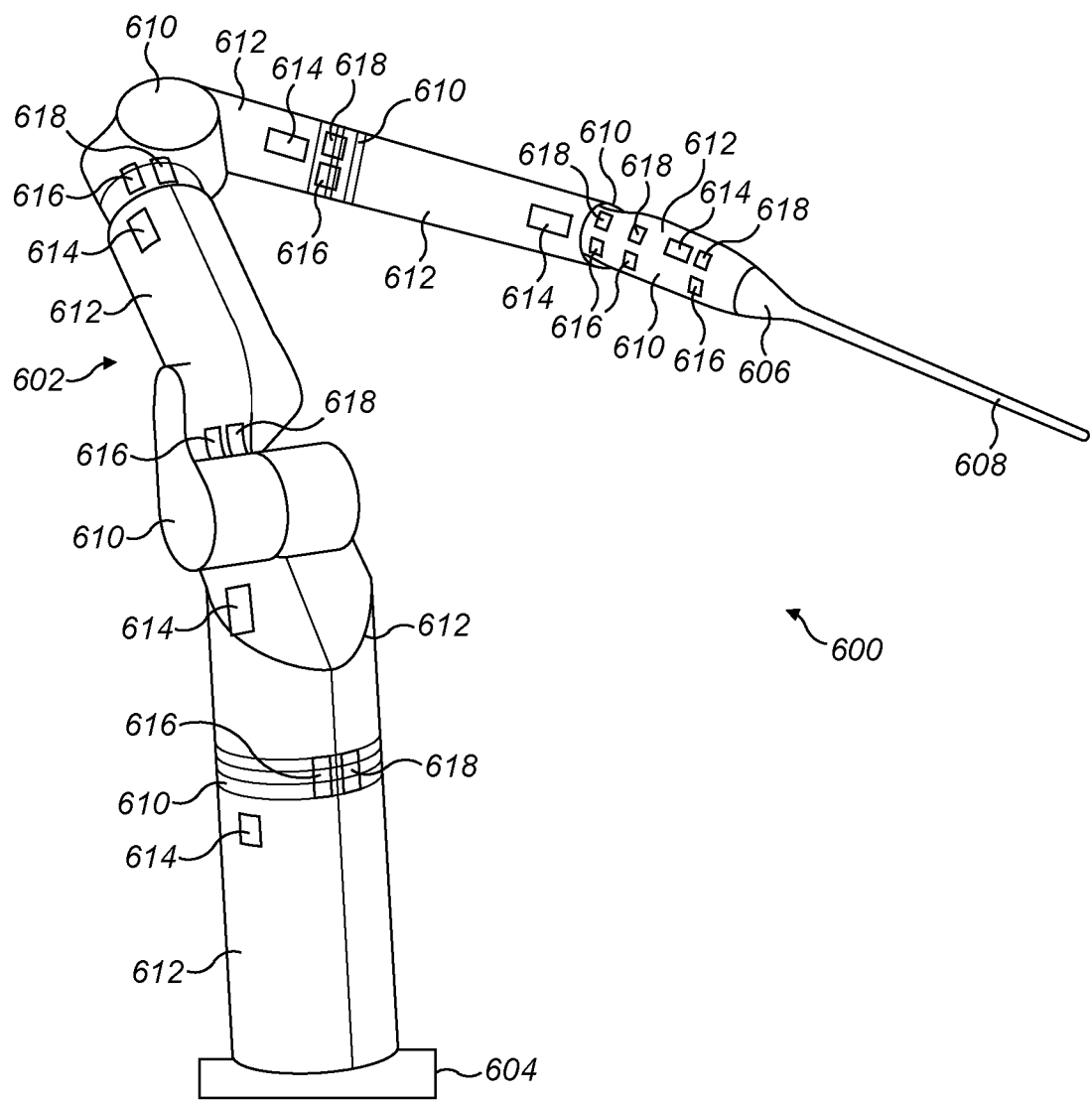
FIG. 6 is a schematic diagram of an example surgical robot of the system of FIG. 5.

Reference is now made to FIG. 6 which illustrates an example surgical robot 600 which may be used to implement the surgical robots 502, 504 of FIG. 5. The surgical robot 600 comprises an arm 602 which extends from a base 604 which is fixed in place when a surgical procedure is being performed. In some cases, the base 604 may be mounted to a chassis. The chassis may be a cart, for example a bedside cart for mounting the robot at bed height. Alternatively, the chassis may be a ceiling mounted device, or a bed mounted device.

The arm 602 extends from the base 604 of the robot to an attachment 606 for the surgical instrument 608. The arm is flexible. It is articulated by means of multiple flexible joints 610 along its length. In between the joints are rigid arm members 612. The arm in FIG. 6 has seven joints. The joints include one or more roll joints (which have an axis of rotation along the longitudinal direction of the arm members on either side of the joint), one or more pitch joints (which have an axis of rotation transverse to the longitudinal direction of the preceding arm member), and one or more yaw joints (which also have an axis of rotation transverse to the longitudinal direction of the preceding arm member and also transverse to the rotation axis of a co-located pitch joint). However, the arm could be jointed differently.

For example, the arm may have fewer or more joints. The arm may include joints that permit motion other than rotation between respective sides of the joint, for example a telescopic joint. The robot comprises a set of drivers 614, each driver 614 drives one or more of the joints 610.

The attachment 606 enables the surgical instrument 608 to be releasably attached to the distal end of the arm. The surgical instrument 608 has a linear rigid shaft and a working tip at the distal end of the shaft. The working tip comprises an end effector for engaging in a medical procedure. The surgical instrument may be configured to extend linearly parallel with the rotation axis of the terminal joint of the arm. For example, the surgical instrument may extend along an axis coincident with the rotation axis of the terminal joint of the arm. The surgical instrument 608 could be, for example, a cutting device, a grasping device, a cauterising device or image capture device (e.g. endoscope).

The robot arm comprises a series of sensors 616, 618. These sensors comprise, for each joint, a position sensor 616 for sensing the position of the joint, and a torque sensor 618 for sensing the applied torque about the joint's rotation axis. One or both of the position and torque sensors for a joint may be integrated with the motor for that joint.

Control Parameters Associated with Operator

As described above, each operator (e.g. surgeon) may be associated with one or more sets of control parameters for one or more instrument types. For example, the set of control parameters that are associated with an operator may comprise one or more sets of control parameters for a cutting instrument, one or more sets of control parameters for a grasping instrument and/or one or more sets of control parameters for an image capture device (e.g. endoscope). The control parameters that form a set of control parameters may be different for different instruments. The collection of sets of control parameters for an operator may be referred to herein as the operator's library of control parameters. The operator's library of control parameters defines the operator's preferences when using certain instruments.

In some cases, the surgical robot system 500 may comprise a graphical user interface (GUI) that allows the operator to view and manage their library of control parameters. The GUI may be accessible via the operator console (e.g. via the display thereof) and/or via a secure external computer.

Figure 7:
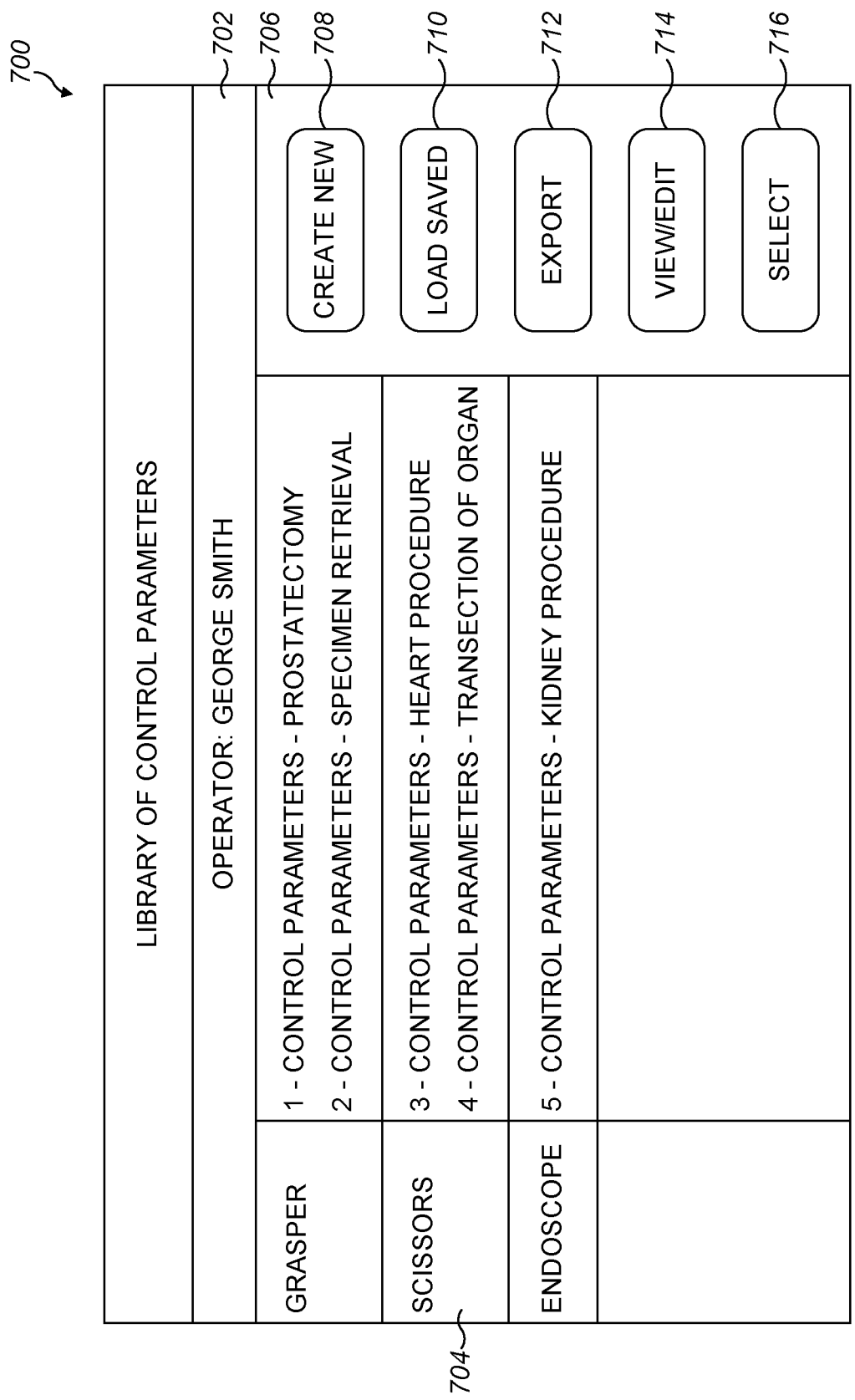
FIG. 7 is a schematic diagram of an example graphical user interface for viewing and managing an operator's library of control parameters.

Reference is now made to FIG. 7 which illustrates an example GUI 700 for an operator to view and manage their library of control parameters. As shown in FIG. 7, the GUI 700 provides the operator (e.g. surgeon) with a list of the sets of control parameters associated with the operator. For example, in FIG. 7 the GUI 700 may comprise an operator identification section 702 which identifies the operator— 'George Smith' in this example, and a library section 704 which displays the sets of control parameters associated with the identified operator. In the example the operator ('George Smith') has five sets of control parameters in his library— two sets of control parameters for a grasper instrument, two sets of control parameters for a scissors instrument, and one set of control parameters for an endoscope. In some cases, as shown in FIG. 7, the sets of control parameters may be sorted or grouped by instrument type. For example, in FIG. 7 the two sets of control parameters for a grasper instrument are grouped together, and the two sets of control parameters for a scissors instrument are grouped together. In other cases, they may be sorted in another manner (e.g. by procedure type).

The operator may be able to add a set of control parameters for an instrument to the operator's library by: (i) creating a new set of control parameters for the instrument; (ii) loading a copy of a set of control parameters for an instrument generated by another person (e.g. another operator or an administrator) into the operator's library; or (iii) loading a copy of a set of control parameters generated by a computer based on data from procedures performed with the surgical robot system or a similar surgical robot system. For example, the GUI 700 of FIG. 7 comprises an action section 706 which comprises a first button (e.g. a create new button 708) which if clicked, or otherwise activated by the operator takes the operator to a 'new control parameter' screen or GUI (not shown) which allows the operator to create a new set of control parameters. The 'new control parameter' screen may comprise an input (e.g. a drop-down list) which allows the operator to specify which type of instrument the new set of control parameters relate to. Once a type of instrument has been selected the operator may be presented with a list of configurable/editable control parameters for the instrument (which may be presented to the operator in a similar manner as the 'view/edit control parameter' screen or GUI discussed below with respect to FIG. 8). As described above, the set of configurable/editable control parameters may differ between types of instruments. For example, the set of configurable/editable control parameters for a grasper instrument may be different than the set of configurable/editable control parameters for a set of scissors.

The GUI 700 of FIG. 7 also comprises a second button (e.g. a load saved button 710) which if clicked, or otherwise activated, may show the operator a list of shared sets of control parameters which the operator can download to their library. The list of shared sets of control parameters may be listed by instrument type and/or by who generated (i.e. the creator of) the set of control parameters. The list may be searchable by, for example, creator and/or instrument type. The list of shared sets of control parameters may be stored, for example, on a secure server and/or a secured cloud environment. The operator may download any of the shared set of control parameters into his/her library.

One or more of the shared sets of control parameters may have been generated by another operator. For example, an operator may have found a particular set of control parameters for an instrument to work particularly well and may want to be able to share that set of control parameters with other operators so that they can use that set of control parameters. In the example GUI 700 of FIG. 7 an operator may be able to make a set of control parameters for an instrument available for use by other operators (e.g. export the set of control parameters to the shared server or the cloud) by selecting the desired set of control parameters from the library section 704 and then clicking, or otherwise selecting the export 712 button in the action section 706. This may cause the selected set of control parameters to be uploaded to the shared server or cloud.

One or more of the shared sets of control parameters may additionally, or alternatively, be generated by an administrator or by the surgical robot system manufacturer. For example, the surgical robot system manufacturer may perform a number of tests to determine a set of control parameters that works well for a majority of the operators; and/or the surgical robot system manufacturer may receive feedback from operators and generate a set of control parameters based on the feedback.

One or more of the shared sets of control parameters may additionally, or alternatively, be generated by a computer system. For example, a computer system may be configured to receive the control parameters for a number of surgical procedures performed using the surgical robot system or a similar surgical robot system and the outcome of the procedure (e.g. positive/negative) and generate an optimum set of control parameters therefrom. It will be evident to a person of skill in the art that this is an example only and that other data related to surgical procedures may be used to generate a set of control parameters for an instrument.

Once a set of control parameters has been added to the operator's library of control parameters the operator may be able to view and edit that set of control parameters; or select (e.g. during a procedure) that set of control parameters to be used as the current set of control parameters for an instrument. For example, in the GUI 700 of FIG. 7 the operator may be able to select a set of control parameters to be used as the current set of control parameters for an instrument by selecting the desired set of control parameters in the library section 704 and then selecting, or otherwise, activating a select button 716. Similarly, in the GUI 700 of FIG. 7 the operator may be able to view and/or edit a set of control parameters for an instrument by selecting the desired set of control parameters in the library section 704 and then selecting, or otherwise activating the view/edit button 714 of the action section 706. This may take the operator to (or display to the operator) a 'view/edit control parameter' screen or GUI which allows the operator to view and/or edit the control parameters. An example 'view/edit control parameter' screen or GUI 800 is shown in FIG. 8.

Figure 8:
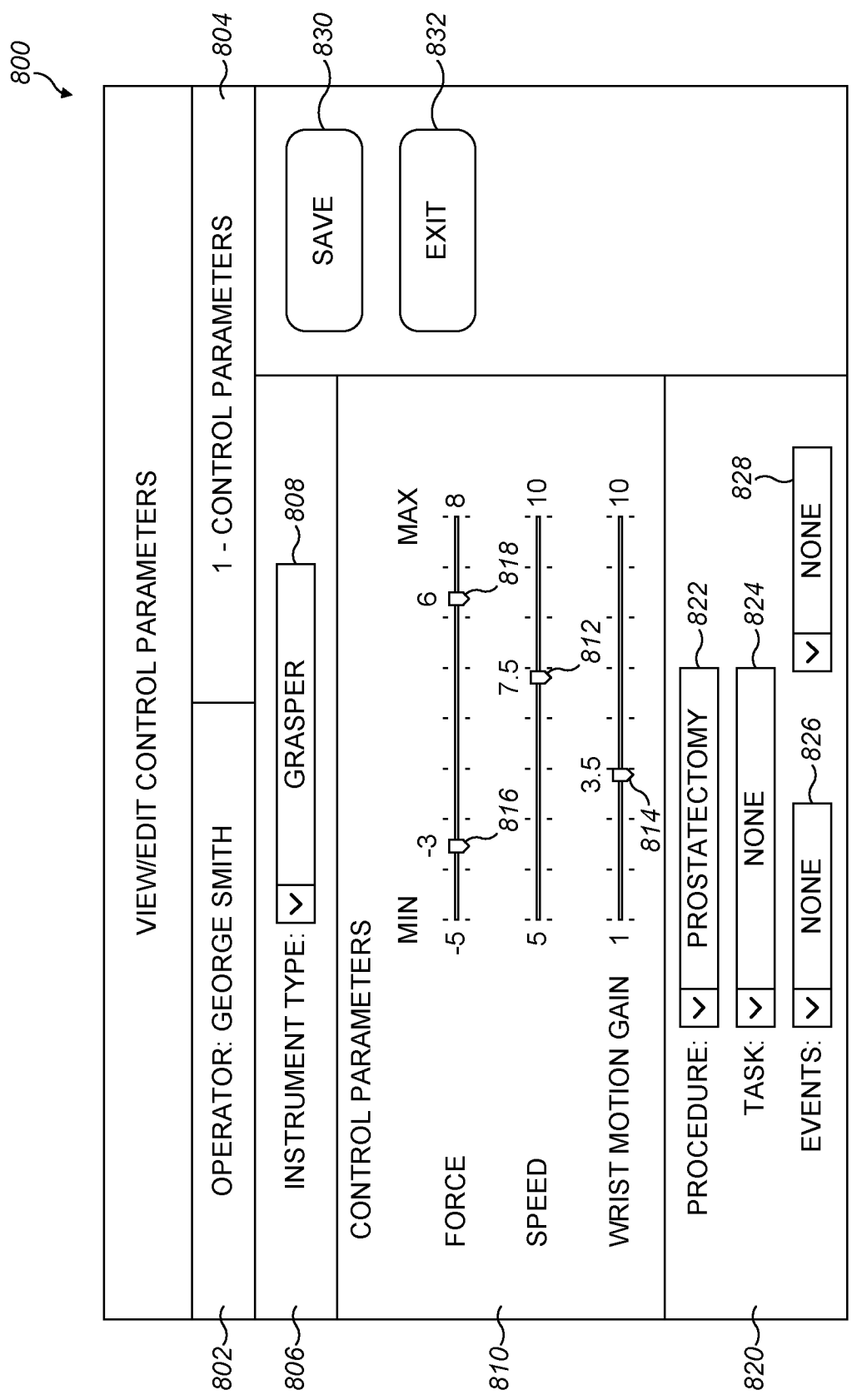
FIG. 8 is a schematic diagram of an example graphical user interface for viewing and editing a particular set of control parameters.

In FIG. 8 the 'view/edit control parameter' screen or GUI 800 comprises an operator identification section 802 which identifies the operator (e.g. 'George Smith') associated with the set of control parameters being displayed. The 'view/edit control parameter' screen or GUI 800 also comprises a control parameter identification section 804 which identifies the set of control parameters being displayed. In FIG. 8 the control parameter identification section 804 indicates that the control parameters relate to the set of control parameters number 1 of FIG. 7.

The 'view/edit control parameter' screen or GUI 800 also comprises an instrument type section 806 which shows the current instrument type associated with the set of control parameters and allows the operator to change the instrument type. For example, as shown in FIG. 8 the instrument type section may comprise an instrument type drop-down menu 808 which initially shows the instrument type that the set of control parameters is associated with, but if the instrument type drop-down menu 808 is activated it may show the operator a list of possible instrument types. The operator can change the instrument type by selecting another instrument type from the drop-down menu. For example, the instrument type section 806 in FIG. 8 shows that the set of control parameters that is being display is currently associated with a grasper instrument.

The 'view/edit control parameter' screen or GUI 800 also comprises a control parameter section 810 which shows the current configuration of each control parameter and allows the operator to change any and all of the displayed control parameters. In some cases, the system may be configured such that any operator configured control parameter is in line with system capabilities and safety. Accordingly, there may be a defined maximum and minimum for each control parameter to guarantee system safety. In some cases, the current configuration of each control parameter may be shown using a slider or a set of sliders. Specifically, the slider may show the value(s) between the minimum and maximum that the parameter is currently set to. For example, in FIG. 8 there is a slider 812 for the speed control parameter which controls the speed at which the instrument performs an action. It can be seen that in this example the absolute minimum speed is 5, the absolute maximum speed is 10 and the speed is currently set at 7.5. Similarly in FIG. 8 there is a slider 814 for the wrist motion gain parameter which controls the wrist motion gain. It can be seen that in this example the absolute minimum gain is 1, the absolute maximum gain is 10 and the gain is currently set at 3.5. In some cases, a control parameter may have two values. For example, the force control parameter may have a minimum force and a maximum force which can be set by the operator. In these cases, the control parameter may be represented by a set of sliders. For example, the force control parameter of FIG. 8 is represented by two sliders 816, 818—a lower slider 816 and a higher slider 818. The lower slider 816 indicates the minimum force and the higher slider 818 indicates the maximum force. In the example of FIG. 8 the absolute minimum force is −5, the absolute maximum force is 8, the minimum force to be applied to the instrument is currently set at −3 (i.e. the force used to cause the instrument to move to the open position), the maximum force to be applied to the instrument is currently set at 6 (i.e. the force used to cause the instrument to move to the closed position).

In this example the operator may be able to modify a control parameter by moving the appropriate slider 812, 814, 816, 818 up or down. For example, to increase the wrist motion gain parameter the operator may move the slider 814 to the right. Similarly, to decrease the minimum force applied to the instrument the operator may move the slider 816 to the left. It will be evident to a person of skill in the art that this is just an example control parameter section 810 and in other examples the control parameter section 810 may be implemented in a different manner. For example, instead of having a slider, the operator may simply be able to enter a value between the absolute minimum and the absolute maximum.

For some control parameters it may be obvious or intuitive how adjusting that control parameter will affect the movement and/or usage of the instrument. For example, it would be obvious to an operator how increasing the force or decreasing the force control parameter will affect the movement and/or usage of an instrument. Accordingly, the operator may be able to directly adjust such control parameters. However, for other control parameters (e.g. those whether there is a non-linear relationship between the control parameter and the movement of the instrument, such as, but not limited to, a progressive gripping control parameter), it may not be obvious or intuitive how adjusting that control parameter will affect the movement and/or usage of the instrument. Accordingly, the operator may not be allowed to directly adjust these parameters. Instead, the operator may be presented with a quasi control parameter which represents one or more real control parameters, and can be adjusted in a more intuitive manner. The control unit may then be configured to translate the value of a quasi parameter to corresponding values for the one or more real control parameters that it represents. For example, where the hand controller comprises a lever or pincer which can be moved to move the jaws of a gripper instrument to open or closed positions there may be a progressive gripping force parameter that is used to determine the gain relating the lever force/position to the gripper force/position which may vary depending on the current or instantaneous force/position of the lever or the grasper. For example, as the operator increases the force at the lever or pincer, the gain also increases leading to a non-linear relationship between the lever force and the grasper force. Instead of allowing the operator to adjust such a non-linear parameter the operator may instead be presented with a single parameter, such as the "instrument applied force parameter" described above which can be amended in a more intuitive manner. The instrument applied force parameter may then be mapped to the progressive gripping force parameter.

The 'view/edit control parameter' screen or GUI 800 of FIG. 8 also comprises an association section 820 which shows what procedure, task or events the set of control parameters is associated with or is designed to be used with/during. As described above, the operator may be able to associate or link a set of control parameters to one or more of (i) a procedure; (ii) a task within a procedure; and (iii) one or more detectable events or conditions. This may allow the operator to specify both general control parameters for an instrument that the operator has found work well most of the time, and specific control parameters that the operator has found work well in specific situations (e.g. for completing a specific task or step of a procedure). Associating a set of control parameters for an instruction with a procedure, task or one or more detectable events/conditions may also allow the control unit 510 to dynamically and automatically select the appropriate set of control parameters for a procedure and/or during a procedure. Example events and conditions that the control unit 510 may be able to detect, and how they may be detected are described in detail below.

The example association section 820 of FIG. 8 comprises a procedure sub-section that identifies the current procedure (if any) associated with the set of control parameters and allows the procedure associated with the set of control parameters to be adjusted or changed. For example, as shown in FIG. 8 the procedure sub-section may comprise a procedure drop-down menu 822 which is configured to show the procedure (if any) that the set of control parameters is associated with. If the procedure drop-down-menu 822 is activated, it may show the operator a list of possible procedures that the selected instrument type may be used in. The operator can change the procedure by selecting another procedure type from the displayed list. The procedure drop-down menu 822 of FIG. 8 indicates that the set of control parameters is associated with a prostatectomy procedure.

The example association section 820 of FIG. 8 also comprises a task sub-section that identifies the current task (if any) associated with the set of control parameters and allows the task associated with the set of control parameters to be adjusted or changed. For example, as shown in FIG. 8 the task sub-section may comprise a task drop-down menu 824 which is configured to show the task (if any) of a procedure that the set of control parameters is associated with. If the task drop-down-menu 824 is activated, it may show the operator a list of possible tasks or steps of a procedure that the selected instrument type may be used with. In some cases, the list of tasks may be based on the type of procedure that the set of control parameters is associated with. For example, for a prostatectomy, the list of tasks may include: releasing the bladder; endopelvic fascia; anterior and posterior bladder neck; seminal vesicles and rectum; clipless transection of the prostatic pedicles and the neurovascular bundles (NVBs); dorsal venous complex (DVC) and urethral transection; and Rocco and Van Velthoven anastomosis. The operator can change the task or step by selecting another task from the displayed list. The task drop-down menu 824 of FIG. 8 indicates that the set of control parameters is not currently associated with any task. If a set of control parameters is not associated with a task, then the set of control parameters may be described as a general set of control parameters for the associated procedure.

The example association section 820 of FIG. 8 also comprises an events sub-section that identifies the current detectable event(s) (if any) associated with the set of control parameters and allows the event(s) associated with the set of control parameters to be adjusted or changed. A detectable event is an event that can be detected by the control unit 510 in real-time from the data received about the surgical robot system or the environment in which the surgical robot system is operating. Example events which may be detectable by the control unit 510 include, but are not limited to: a specific tissue type shown in the endoscope video; a specific body part or organ visible in the endoscope video; the distance between an instrument and an organ or body part is below a predetermined threshold; the current stage, step or task of the procedure (e.g. which may be detected, for example, by detecting certain movements of an instrument—for example, some small repetitive movements in a certain pattern may indicate a stitching task); a specific instrument (e.g. electrosurgical instrument) or combination of instruments (e.g. a grasper instrument and a scissors instrument) is/are attached to the surgical robots 502, 504; whether or not the operator's palm is or is not in contact with the hand controller. A more comprehensive list of detectable events and how they may be detected is described below. A set of control parameters may be associated with one or more than one detectable event. Allowing a set of control parameters to be associated with a variety of different detectable events allows the operator to generate sets of control parameters for very specific situations. For example, it may allow an operator to specify a set of control parameters for use in a gallbladder procedure when the gallbladder is visible in the endoscope video. In another example, the hand controllers may be equipped with one or more sensors to detect whether the operator's palm is currently in contact with the hand controller. If a hand controller is being used to control an instrument and the one or more sensors detect that the operator's palm is no longer in contact with a hand controller then the control unit 510 may be configured to lock an instrument's position and gripper force to ensure that the instrument does not fall into the patient and/or drop anything into the patient that a set of graspers are currently holding. This may lead to the motors heating up if a high force is required to be maintained. The control parameters may be used reduce the maximum force to be applied to a set of jaws after a period of time has expired since the operator's palm has been removed. The control parameters may also be used to increase or lower the holding force or even the time at which the force should be increased or decreased from the time that the palm was no longer detected.

For example, as shown in FIG. 8 the procedure subsection may comprise two event drop-down menus 826, 828 which are configured to show the detectable events (if any) of a procedure that the set of control parameters is associated with. It will be evident to a person of skill in the art that this is an example only and that in other cases a set of control parameters may be associated with more than two detectable events or only one detectable event. If an event drop-down-menu 826, 828 is activated it may show the operator a list of possible detectable events. The operator can change the event(s) that the set of control parameters is associated with by selecting an event from the displayed list. The event drop-down menus 826, 828 of FIG. 8 indicate that the set of control parameters is not currently associated with any detectable events.

The operator may be able to edit a set of control parameters during a procedure or offline (e.g. not during procedure). For example, after a procedure or after training, the operator may want to change a set of control parameters to reflect a feature of the procedure or training that they were not happy with or they did not feel was quite right.

The operator may be able to save any changes by, for example, clicking on or otherwise selecting a save button 830. The operator may be able to return to the main screen (e.g. screen or GUI 700) by clicking on or otherwise selecting an exit button 832.

It will be evident to a person of skill in the art that FIGS. 7 and 8 illustrate example GUI screens for allowing an operator to view and manage their library of control parameters and that in other examples the GUI may comprise different fields and be arranged in a different manner.

In some cases, in addition, or alternatively to being able to change or modify a set of control parameters using a GUI, such as the GUI 700, 800 of FIGS. 7 and 8, an operator may be able to modify a set of control parameters using voice commands and/or create a new set of control parameters for use in a particular situation. For example, the operator may be able to say something such as "minimize scaling gain to 0.1 when gallbladder is visible" during a procedure, which may cause the control unit 510 to generate a copy of the current set of control parameters but with a gain of 0.1, and associate the new set of control parameters with the detectable event of the gallbladder being visible in the endoscope video. If the control unit 510 is currently operating in the third mode described above, this may mean that as soon as the gallbladder becomes visible in the endoscope video that the control unit 510 automatically switches to using the newly generated set of control parameters In another example, the operator may say something such as "reduce and lock scissor maximum speed for severing gall bladder" during a procedure, which may cause the control unit 510 to generate a copy of the current set of control parameters for the scissors instrument with a reduction in the maximum speed to a constant speed so that the scissors can only move at that speed, and associate the new set of control parameters with the detectable event of the severing gallbladder task. If the control unit 510 is currently operating in the third mode described above, this may mean that as soon as it is detected that the severing gallbladder task has begun or is about to begin, the control unit 510 may be configured to use the new set of control parameters for the scissors instrument. In yet, another example the operator may something like "exert a constant grip force of 5N when palm isn't detected by the hand controller" during a procedure, which may cause the control unit 510 to generate a set of control parameters for a gripper or grasper instrument which cause a constant force to be applied to the jaws of the gripper or grasper instrument, and associate the new set of control parameters with the detectable event that the operator's palm is not longer in contact with a hand controller.

Energised Instruments

An electrosurgical instrument is a surgical instrument adapted to perform electrosurgery. As is known to those of skill in the art, electrosurgery is the passing of a high frequency (i.e. radio frequency) current through tissue to cause a desired effect (e.g. cutting the tissue or coagulating the tissue). In contrast to electrocautery which uses heat conduction from a probe heated by a direct current, electrosurgery uses radio frequency (RF) alternating current to heat the tissue by RF induced intracellular oscillation of ionized molecules that result in an intracellular temperature.

Electrosurgical instruments receive the high frequency current (which is referred to herein as a driving electrosurgical signal) from an electrosurgical generator, which may also be referred to as an electrosurgery generator, electrosurgical end unit, electrosurgery end unit, or ESU. Electrosurgical generators are generally capable of generating multiple different current waveforms to achieve different surgical effects. For example, many electrosurgical generators can be configured to generate COAG, CUT and BLEND waveforms. The COAG waveform consists of bursts of radio frequency, which when used at a low power setting causes a desiccation effect, and when used at a high-power setting causes a fulguration effect. The CUT waveform is a continuous waveform at lower voltage, but higher current than COAG, which causes the tissue to be cut. A BLEND waveform is essentially a CUT waveform with a lower duty cycle than a CUT waveform. A BLEND waveform typically has a duty cycle between 15% to 75% whereas a CUT waveform typically has a duty cycle greater than 75%. The off time allows the tissue to cool creating some haemostasis. Accordingly, a BLEND waveform is used where haemostasis is required as tissue is cut. It will be evident to a person of skill in the art that these are examples only and that different electrosurgical generators may be configured to generate different and/or additional waveforms.

A driving electrosurgical signal generated by an electrosurgical generator may be defined by a set of electrosurgical control parameters. The electrosurgical control parameters may include one or more of: the power output as a function of the load resistance; the maximum power output; the form of the high frequency (e.g. RF) voltage; the peak voltage; the frequency; and the duty cycle.

When an electrosurgical instrument is used in a surgical robot controlled procedure the operator may be able to activate or energise the electrosurgical instrument by providing an input (e.g. by pressing a special electrosurgical button on the hand controller) to the control unit. The input causes the electrosurgical generator connected to the electrosurgical instrument to output a pre-configured driving electrosurgical signal to the electrosurgical instrument.

In some cases, in addition or alternatively, to being able to store sets of control parameters which control the movement of an instrument, the operators may also be able to store and configure sets of electrosurgical control parameters which can be used to control the driving electrosurgical signal provided to an electrosurgical instrument. For example, the operators may be able to store in their library of control parameters one or more sets of electrosurgical control parameters which define a driving electrosurgical signal. Then, during a procedure that uses an electrosurgical instrument, one or more of those sets of electrosurgical control parameters may be associated with the electrosurgical instrument and when the control unit 510 receives an input (e.g. from the operator console) that an electrosurgical instrument is to be activated the control unit 510 may be configured to cause the appropriate electrosurgical generator to generate a driving electrosurgical signal to activate the electrosurgical instrument. In other words, the control unit 510 translates the input signal into a set of one or more control signals to the electrosurgical generator which cause the electrosurgical generator to output the desired signal. For example, where an electrosurgical instrument may be used to perform a cut action or a coagulation action then the electrosurgical instrument may be associated with a set of electrosurgical control parameters that define a cut electrosurgical signal, and a set of electrosurgical control parameters that define a coagulation electrosurgical signal. Then, when the control unit 510 receives an input from the operator console that the electrosurgical instrument is to be activated with a cut waveform, the control unit 510 may send a set of one or more signals to the electrosurgical generator that cause the electrosurgical generator to output an electrosurgical signal in accordance with the set of electrosurgical control parameters that define a cut electrosurgical signal.

In some cases, there may be a similar GUI to that described with respect to FIGS. 7 and 8 that allows the operator to add and configure sets of electrosurgical control parameters. The operator may also be able to modify or generate a new set of electrosurgical control parameters (e.g. during a procedure) using voice commands in a similar manner as described above with respect to modifying or generating a set of control parameters using voice commands.

In some cases, there may be a desired or preferred setting for one or more control parameters (i.e. movement control parameter) for performing an electrosurgical action or task (e.g. a coagulation or cutting action using an electrosurgical instrument) based on one or more electrosurgical conditions. An electrosurgical condition is used herein to mean a feature or condition that affects the electrosurgical action. Example electrosurgical conditions may include, but are not limited to, energising an electrosurgical instrument; the type of electrosurgical action or task being performed; the type of electrosurgical instrument; the type of tissue on which the electrosurgical action is being performed; the impedance or admittance that the tissue on which the electrosurgical action is being performed provides to the electrical current flowing through it; the conductance of the tissue on which the electrosurgical action is being performed; the amount of energy applied to the tissue over time; the duty cycle of the driving electrosurgical signal; the peak voltage of the driving electrosurgical signal; and the frequency of the driving electrosurgical signal. The impedance, admittance, conductance or capacitance of tissue may change as the tissue properties change.

For example, in an electrosurgical vessel sealing task wherein tissue compression (performed via the grasping elements of, for example, a cut and seal electrosurgical instrument) is combined with tissue heating (via a driving electrosurgical signal) to produce haemostasis in arteries, veins or a bundle of tissue (or other body part), it may be desirable to increase the force exerted on the jaws of the instrument (i.e. the grasping force) at the same time the instrument is energised. The optimum grasping force may be based on the type of tissue that the operation is being performed on and the type of seal. It has been shown that this can help ensure that the artery, vein, bundle of tissue or other body part, is sealed properly. Sealing may be performed prior to removal or resection of an organ or body part. The term grasping element is used herein to mean a moveable element which can be moved to perform a grasping, gripping or grabbing action. An instrument may have one grasping element that is moveable to engage a non-moveable element to perform a grasping action, or two moveable elements that can be moved in unison to perform a grasping action. The grasping element may, for example, be a jaw with or without serrations or another element without serrations.

Where the control unit 510 is capable of detecting real-time events and conditions during a procedure (as described in more detail below) and the real-time detectable events include electrosurgical events then the control unit 510 may be configured to, when it detects one of one or more predetermined electrosurgical events, adjust one or more control parameters of the set of control parameters currently being used by the control unit 510 to map or translate inputs from the operator to control signals that cause movement of the instrument. An electrosurgical event may be a specific electrosurgical condition (e.g. energisation of an electrosurgical instrument) or a combination of electrosurgical conditions (e.g. the conductance of the tissue is less than a first threshold and the frequency of the driving electrosurgical signal is greater than a second threshold). In some cases, the control unit 510 may be configured to detect some electrosurgical conditions, and thus some electrosurgical events, by monitoring the electrosurgical signals (e.g. the driving electrosurgical signal and the return electrosurgical signal (i.e. the electrical signal that leaves the patient's body)). For example, the control unit 510 may be able to determine the impedance, admittance, capacitance, or conductance of the patient's tissue from the return electrosurgical signal.

For example, in some cases the control unit 510 may be configured to, when it detects energisation of an electrosurgical instrument in a vessel sealing task, automatically adjust the set of control parameters currently being used to map the inputs received from the operator (e.g. via the operator console 512) with respect to movement of the electrosurgical instrument so that an optimum amount of grasping force is applied to the instrument. As noted above, the optimum grasping force may be based on, for example, the type of seal and the tissue it is being applied to. In many cases the optimum grasping force is the maximum force that can be applied to the instrument, however, in other cases, the optimum force may be less than the maximum. The automatic adjustment of the control parameters of the instrument to apply an optimum grasping when the instrument is energised may improve the sealing of arteries, veins, bundles of tissue and other body parts over current methods where the gripping or grasping force may be manually adjusted by the operator via, for example, the hand controllers.

In some cases, the optimum grasping force for a sealing task may change during the task (e.g. while the instrument is energised). For example, in some cases, if the sealing is progressing as normal the optimum grasping force may decrease as the sealing progresses. In other cases, the optimum grasping force may increase as the sealing progresses. Accordingly, in some cases, the control unit 510 may be configured to monitor the tissue properties (by, for example, monitoring the return electrosurgical signal) to determine the degree of sealing and adjust the set of control parameters to apply a progressively lower (or progressively higher) grasping force to the instrument as the sealing progresses. In these cases, the electrosurgical events that may be detected by the control unit 510 which trigger a change in the control parameters for the instrument may be different percentages of sealing. For example, the control unit 510 may be configured to detect when there has been 25% sealing, 50% sealing and 75% sealing, and, when each of these events have been detected, adjust the control parameters for the instrument so as to apply a reduced grasping force to the instrument. In some cases, in addition or alternatively to monitoring the progress of the sealing and adjusting the grasping force during the sealing, the control unit 150 may be configured to detect when the sealing of the vessel or other body part is complete and automatically adjust the control parameters for the instrument so as to reduce the grasping force (e.g. back to what it was before the sealing began—e.g. before the instrument was energised).

It will be evident to a person of skill in the art that this is only an example and that other control parameters for an instrument such as, but not limited to, velocity parameters (e.g. a velocity limit parameter), gain parameters and angular parameters (e.g. an angular limit parameter) may be automatically modified in response to detecting an electrosurgical event. For example, in other example, it may be advantageous for the grasping element to have minimal movement during an energised action or task (e.g. sealing action or task) so that the seal is applied where desired and there is minimal pull on the tissue that is being sealed. In these cases, the control unit 510 may be configured to automatically adjust the control parameters for the instrument so as to minimize movement (e.g. velocity). In other example, in addition to comprising one or more grasping elements (e.g. a pair of jaws) a cut and seal electrosurgical instrument may also comprise a blade or other sharp edge which may be used to cut the vessel once it is sealed. In these cases, the control unit 510 may be configured to control movement of the blade (via the control parameters for the instrument) based on detected electrosurgical events. In yet another example, the one or more grasping elements (e.g. a pair of jaws) of a cut and seal electrosurgical instrument, in addition to being able to move between an open position and close position, may also be able to move axially so as to effect shear in the tissue and cut it. In these cases, the control unit 510 may be configured to control the axial movement of the grasping elements (e.g. via the control parameters for the instrument) based on detected surgical events. For example, the control unit 510 may be configured to limit the axial movement of the grasping element(s) (by adjusting one or more of the control parameters) while the electrosurgical instrument is energised.

In some cases, the control unit 510 may be configured to, subsequent to adjusting the set of control parameters for an electrosurgical instrument in response to detecting an electrosurgical event, automatically adjust the set of control parameters back to what it was before the event. For example, if, as described above, the control unit 510 is configured to automatically adjust the control parameters for an electrosurgical instrument when it detects that an electrosurgical cut and seal instrument is energised as part of a vessel sealing task, the control unit 510 may be configured to, once the instrument is not longer energised to go back to using the set of control parameters that were used prior to the energisation of the instrument. In other cases, the control unit 510 may be configured to change the set of control parameters in response to the next detected event.

In some cases, the control unit 510 may also be able to dynamically control or change one or more features of the driving electrosurgical signal provided to the electrosurgical instrument based on a detected electrosurgical event or condition. For example, the control unit 510 may be able to automatically change the frequency, duty cycle or any other parameter of the driving electrosurgical signal. The control unit 510 may be able to change the driving electrosurgical signal by sending one or more configuration control signals to the electrosurgical generator generating the driving electrosurgical signal.

An electrosurgical instrument is merely an example type of energised instrument. Specifically, an energised instrument is an instrument energised by an electrical signal to perform a surgical function (e.g. cauterising, cutting etc.). It will be evident to a person of skill in the art that the operators may be able to store and configure similar sets of control parameters (which may be generally referred to as energised control parameters) for controlling the driving electrical signal (which may also be referred to as the driving energising signal or the driving energised signal) for other energised instruments; and/or the control unit 510 may be able to automatically adjust the control parameters for an instrument in response to detecting one of one or more predetermined energised events, conditions or combination thereof. Examples of other energised instruments include, but are not limited to, electrocautery instruments, laser instruments and ultrasonic instruments.

Providing an Indication of the Control Parameters During Procedure

During a surgical procedure performed, at least partially, by a surgical robot system (e.g. system 500) the display 520 of the operator console 512 is used to display a video stream of the surgical site (e.g. a video stream captured by an endoscope or another suitable image capture device) or a representation thereof. In some cases, the video stream of the surgical site may be captured by an image capture device (e.g. endoscope) attached to, and controlled by, one of the surgical robots 502, 504 of the surgical robot system 500. In some cases, where the surgical robot system has surgical robots, the operator of the surgical robot system may not be able to operate a surgical robot of the surgical robot system 500 in surgical mode (i.e. to perform a surgical procedure) unless an operative endoscope is attached to, and controlled by, one of the robot arms. However, in other cases, the video stream may be captured by a manually controlled image capture device (e.g. endoscope).

Figure 9:
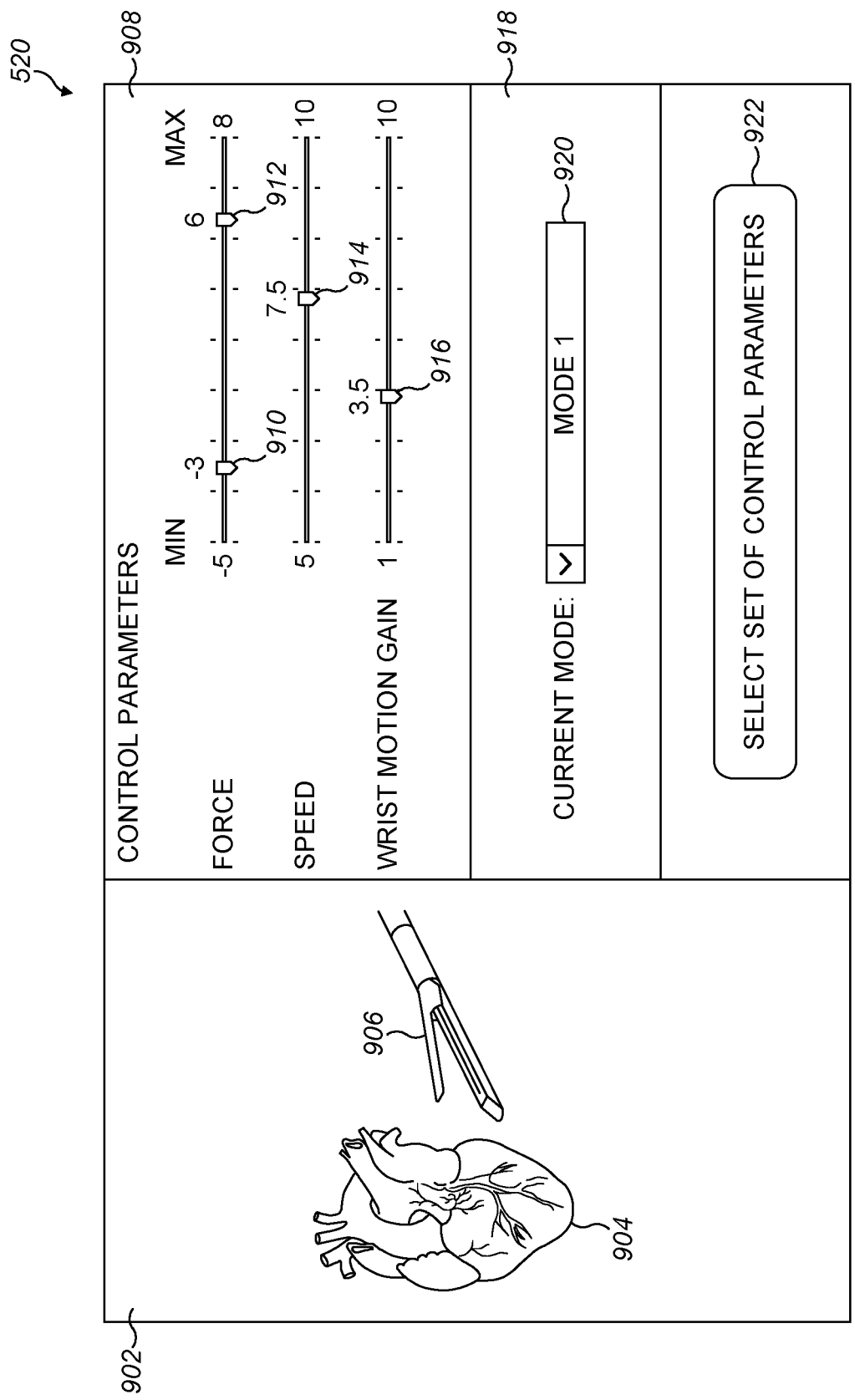
FIG. 9 is a schematic diagram illustrating an example of visually displaying the current set of control parameters to an operator.

For example, as shown in FIG. 9 the display 520 of the operator console 512 may be used to display a video stream 902 of the surgical site to the operator. The video stream 902 of the surgical site may comprise images of the anatomy 904 of the patient. The video stream 902 may also comprise images of the instrument 906 attached to, and being controlled by, a surgical robot 502, 504 of the surgical robot system 500.

In some cases, the display 520 may also be used to provide the operator with a visual indication of the set of control parameters that are currently being used to control the active instrument (wherein the active instrument is the instrument that is currently being controlled from the operator console by the operator). For example, as shown in FIG. 9, a section 908 of the display 520 may be used to display an indication of the set of control parameters used to control the active instrument. As shown in FIG. 9 this may mimic the control parameter section 810 of the 'view/edit control parameters' screen or GUI 800 of FIG. 8. For example, the current setting of each control parameter may be represented by a slider 910, 912, 914, 916 that is set on the current value of the parameter between a maximum and minimum value. For example, in FIG. 9 there is a slider 910 showing the selectable minimum force value (which is currently set to −3), a slider 912 showing the selectable maximum force value (which is currently set to 6). The operator may be able to adjust the control parameters using the sliders 910, 912, 914, 916 as described with respect to FIG. 8. In some cases, a visual indication of the current control parameters may always be displayed on the display 520. However, in other cases, the visual indication of the set of control parameters may only be displayed at the request of the operator (e.g. by providing an input to display the current set of control parameters). This may allow the space on the display 520 to be used for other useful information. It will be evident to a person of skill in the art that this is an example only and that there may be more, fewer and/or different control parameters for an instrument and the current set of control parameters for the active instrument may be displayed in another manner.

Where the control unit 510 supports multiple modes of operation for controlling an instrument, the display 520 may be used to provide the operator with a visual indication of the current mode of operation of the control unit 510 with respect to the active instrument. It is noted that a control unit 510 may be using different modes of operation for different instruments. For example, as shown in FIG. 9, a section 918 of the display 520 may be used to display an indication of the current mode of operation of the control unit 510 with respect to the active instrument. In some examples, as shown in FIG. 9, the section 918 may comprise a mode drop-down menu 920 that shows the current mode for the active instrument. When the operator clicks on or otherwise selects the mode drop-down menu 920 a list of possible modes is displayed, and the operator may be able to change the mode of operation by selecting one of the other modes. For example, the operator may want to switch from the third mode (described above) where the set of control parameters for an instrument is automatically selected based on one or more events detected by the control unit, to the manual second mode (described above) where the operator manually selects the sets of parameters to be used during the procedure. It will be evident to a person of the skill in the art that this is only an example way of visually displaying the current mode of operation of the control unit 510 with respect to the active instrument. For example, in other cases, the current mode of operation of the control unit 510 with respect to an instrument may be visually presented to the operator by displaying the instrument in the video stream or the representation of the video stream in a particular colour. For example, each mode may be associated with a different colour and an instrument may be displayed in the colour corresponding to its current operating mode.

In some cases, the display 520 may also provide means for the operator to manually select the set of control parameters to be used for the active instrument. For example, as shown in FIG. 9 the display 520 may be used to display a 'select set of control parameters' button 922 or the like, which, when clicked on or otherwise activated, displays a GUI showing the operator's library of control parameters (e.g. the GUI 700 of FIG. 7). From the GUI 700 showing the operator's library of control parameters the operator can select one of the sets of control parameters in the library as the current set of control parameters for an instrument (e.g. the active instrument).

In some cases, in addition to providing the operator with a visual indication of the current set of control parameters the control unit 510 may also, or alternatively, be configured to provide the operator with a physical indication or physical feedback of the current set of control parameters or a change in the current set of control parameters. For example, in some cases, the control unit 510 may be configured to notify the user of a change in one or more control parameters by changing the feel of the hand controller (e.g. increasing or decreasing resistance to movement).

Detecting Events During the Procedure

As described above, in some cases, the control unit 510 may be able to automatically detect events during a procedure, at least partially, performed using the surgical robot system 500 and select the set(s) of control parameters to be used for an instrument during a procedure based on the detected events. Specifically, in some cases, the control unit may be configured to receive status data that indicates the status of the surgical robot system. The status data may comprise any information about the surgical robot or about the environment in which the surgical robot is operating. The status data is received in real time (or in substantially real time) while the surgical robot system is being used to perform a procedure.

For example, the status data may comprise information or data that describes the current state of the robot arm(s) such as, but not limited to, position and/or torque information that indicates the position and/or movement of the robot arm(s), or the joints thereof. In particular, the status data may comprise the position and/or torque data generated by the position and/or torque sensors 616, 618. For example, each position sensor 616 may report the joint angle of the joint it is sensing, and/or each torque sensor 618 may report the torque acting on the joint it is sensing. It will be evident to a person of skill in the art that this is an example only and that the surgical robot(s) may comprise other sensors that provide information on the status of the robot arm(s).

The status data may also, or alternatively, comprise data or information that describes the state of the instruments attached to the robot arm(s). For example, the status data may comprise information identifying whether there is an instrument attached to the robot arm(s) and, if so, the type of instrument attached to the robot arm(s). In particular, each surgical robot 502, 504 may comprise means for detecting whether an instrument 506, 508 is attached to the arm (e.g. the surgical robot 502, 504 may comprise an instrument engagement means such as that described in the Applicant's published patent application GB 2552855 A which is herein incorporated by reference), and means for automatically detecting the type of instrument (e.g. each instrument may comprise an RFID or other component which is configured to automatically provide information on its identity to the surgical robot system when it is attached to a robot arm) and this information may be provided to the control unit 510 as status data. The status data may also, or alternatively, comprise information such as, but not limited to, position and/or torque information that indicates the position and/or movement of the instrument(s) attached to the robot arm(s). It will be evident to a person of skill in the art that this is an example only and that that the surgical robot or the instruments themselves may comprise other sensors that provide information of the status of the instruments.

Where at least one of the instruments attached to the robot arm(s) is an energised instrument such as, but not limited to, an electrocautery instrument or an electrosurgical instrument, which is energised by an electrical current to perform a surgical function (e.g. cauterising, cutting etc.), the status data may comprise information on the status of the energised instruments such as, but not limited to, whether or not the energised instrument is currently being energised, and if so, the waveform of the electrical current that is used to energise the instrument.

Where at least one of the instruments attached to the robot arm(s) is an endoscope which is inserted to the body and captures images (e.g. a video) of the interior of the patient's body, the status data may comprise the images (e.g. video) captured by the endoscope. As described in the Applicant's co-pending UK patent application No. 1816164.6 entitled AUTOMATIC ENDOSCOPE VIDEO AUGMENTATION, which is herein incorporated by reference, in some cases when the surgical robot system is being used to perform a procedure and an event is detected during the task, the images (e.g. video) captured by the endoscope may be automatically augmented with information identifying the detected event. The status data may also, or alternatively comprise information indicating the position, movement, and/or field of view of the endoscope.

The status data may also, or alternatively, comprise data or information that describes the state of the operator input devices (e.g. input devices 516, 518) which are used to control the operation of the robot arms and instruments. As described above, the operator input devices could, for example, be manually operable mechanical input devices such as hand controllers or joysticks. In these cases, the status data may comprise data such as, but not limited to, position and/or torque data that indicates the position and/or movement of the input devices (e.g. input devices 516, 518). For example, one or more of the input devices may comprise a position sensor which is configured to sense the position of the input device, and/or torque sensor which is configured to sense the torque or force applied to the input device. In some cases, the hand controller may be mounted on parallelogram linkages via gimbals. In these cases, the linkages and/or gimbals may comprise position and/or torque sensors which measure the positions and torque of the joints of the linkage and/or gimbal. These measurements may then be provided to the control unit 510 as status data.

In some cases, where the input devices are hand controllers, each hand controller may comprise one or more hand contact sensors, or the like, which are configured to detect whether a person's hand is in contact with the hand controller or gripping the hand controlling which indicates whether the hand controllers are in use. In these cases, the hand contact detection information generated by the hand contact sensor(s) may be provided to the control unit 510 as status data. In some cases, where the input devices are hand controllers, each hand controller may also, or alternatively comprise one or more grip sensors which are configured to detect the grip force applied to the hand controller (i.e. how tightly the operator is gripping the hand controller). In these cases, the grip force information generated by the grip force sensor(s) may be provided to the control unit 510 as status data. In some cases, the hand contact sensor(s) and the grip sensors may be the same sensor or otherwise integrated. In some cases, the operator may be equipped with motion sensors on his/her hands that detect the motion of the operator's hands. In these cases, the hand motion data generated by the hand motion sensor may be provided to the control unit 510 as status data.

The status data may also, or alternatively comprise, information on the mode of operation of the surgical robot system 500. For example, in some cases the surgical robot system may be able to operate in one of a plurality modes such as, but not limited to, an active mode in which the operator (e.g. surgeon) is controlling one or more of the robot arms to perform a task; a selection mode in which the operator (e.g. surgeon) is selecting or switching which robot arm(s) they are going to control from the operator console; and an instrument change mode in which at least one of the instruments attached to a robot arm is being removed, attached and/or changed. There may also be several types of active mode. For example, in some cases there may be an endoscope active mode in which the operator is controlling an endoscope attached to a robot arm and an instrument active mode in which the operator is controlling one or more other instruments attached to a robot arm. In these cases, the status data may comprise information on the current operating mode of the surgical robot system. It will be evident to a person of skill in the art that these are example modes of operation of a surgical robot system and that there may be additional or different modes of operation of the surgical robot system.

As described above, in some cases the room (e.g. operating room) in which the task is being performed may be equipped with audio and/or video recording equipment to record the sound in the room and/or a visual image of the room while the task is being performed. In these cases, the status data may also, or alternatively, comprise the video and audio data captured by the audio and/or video recording equipment.

In some cases, the status data, may also, or alternatively, comprise information on the task being performed. For example, the status data may comprise information on the task (e.g. surgical procedure) that was at least partially performed by the surgical robot system 500. In some cases, where the task comprises a number of steps, the status data may comprise information indicating the steps of the task that were performed and when they were performed. For example, the operator (e.g. surgeon) of the surgical robot system 500 may be able to indicate during the task which step or phase of the task he/she is currently performing, and this information may be provided to the control unit 510 as status data. For example, the display 520 of the operator console 512 may be used to provide the operator with a list of the steps in the task. The listed steps may be automatically selected based on the task or may be manually entered by the operator (e.g. surgeon). For example, the operator (e.g. surgeon) may be able to manually enter the steps or phases of the task that the operator expects to execute. The operator (e.g. surgeon) may be able to select or otherwise indicate which of the listed steps or phases is currently being performed using the input devices (e.g. input devices 516, 518) by, for example, pressing a button on one of the input devices or via other means (e.g. verbally or via the display where the display is a touchscreen). Any selections made by the operator (e.g. surgeon) may then be provided to control unit 510 as status data.

In some cases, the status data may also, or alternatively, comprise information on the users of the surgical robot system (e.g. the operator (e.g. surgeon) controlling the surgical robot(s) and/or other members of the task team (e.g. surgical team)). For example, in some cases, before the task is started, information may be provided to the surgical robot system which indicates the users that will be performing the task. In other cases, the users (e.g. surgical team) performing the task (e.g. surgery) may be equipped with a device (e.g. RFID device, mobile telephone, tablet etc.) that may automatically transmit information to the surgical robot system and/or the control unit 510 that identifies the user when they are in the vicinity of the surgical robot system. An example of such a system is described in the Applicant's co-pending UK patent application no. 1816165.3 entitled "DEVICE INTEROPERATION" which is herein incorporated by reference.

In some cases, the operator (e.g. surgeon) controlling the surgical robot system, or another member of the task team (e.g. surgical team), may be able to manually indicate that an event has occurred. In particular, in some cases, the operator (e.g. surgeon) may be presented with a list of predetermined events that may occur during the task and the operator (e.g. surgeon) may be able to indicate that one of the predetermined events has occurred by selecting one of the predetermined events. Any selection(s) made by the operator (e.g. surgeon) may then be provided to the control unit 510 as part of the status data. For example, the display 520 of the operator console 512 may also display one or more predetermined events that may occur during the task and the operator (e.g. surgeon) may indicate that one of the predetermined events has occurred by selecting one of the listed events. The predetermined events may be automatically selected based on the type of event, the particular operator and/or any other criteria; or the operator or another user may be able to manually enter a set of events that may occur during the task. In some cases, the control unit 510, may be configured to automatically generate, based on status data for previously performed tasks, high probability events or important events, for example, and it is these high probability events or important events that are presented to the operator (e.g. surgeon) as events that can be manually identified by the operator (e.g. surgeon) or other member of the task team.

The control unit 510 may be configured to detect events that occur during the procedure from the status data and select an appropriate set of control parameters to be used for an instrument based on the detected events. For example, where the event is a stage or task within a procedure and there is a set of control parameters for the relevant instrument associated with the detected stage or task then that set of control parameters may be selected. In another example, where a set of control parameters for an instrument is associated with a specific event or specific combination of events then when that specific event occurs or that specific combination of events occurs then the control unit 510 may be configured to select that set of control parameters for controlling the instrument. The term "event" is used herein to mean the occurrence of an identifiable incident during the task. Events may include, but are not limited to, instrument events; procedure events; and image events. Examples of each of these types of events are described below.

The control unit 510 may be configured to identify an event from the status data by identifying a pattern in the status data. One or more events may be identified by identifying a pattern in a single data stream of the status data or by identifying patterns in multiple streams of the status data. The control unit 510 may be preconfigured with the pattern(s) that identify an event has occurred and which particular event that the pattern identifies. For example, the pattern(s) may be stored in memory 526 of the control unit 510. The events and/or the specific pattern(s) that indicate an event has occurred may be manually determined or may be learned from the status data of previously performed tasks. For example, in some cases the control unit 510, or another computing-based device, may be configured to analyse status data of previously performed tasks which has been manually augmented with event information to identify common patterns in the status data that preceded identified events.

In some cases, the control unit 510 may be configured to detect instrument events from the status data. Instrument events are those events that relate to the instruments used by (e.g. attached to) the surgical robot system 500 during a procedure. A surgical robot procedure (e.g. surgery) often requires a plurality of different surgical instruments. Multiple instruments may be used concurrently (e.g. there may be a plurality of robot arms to which a different instrument is attached and controlled thereby) and/or multiple instruments may be used sequentially (e.g. a first instrument may be attached to a robot arm to perform a specific function, that first instrument may be removed, and a second instrument is attached to that robot arm to perform a different function). An example set of instruments that may be using during a surgical robotic task may include, but it not limited to, scissors, graspers of a variety of forms and geometries, mono and bipolar electrosurgical instruments, other energy-driven instruments (e.g. laser or ultrasound instruments), a stapler, and a tissue sealer. Instrument events may include, but are not limited to, an instrument change; where at least one of the instruments attached to a robot arm during the task (e.g. surgery) is an energised instrument, a change in the status of the energised instrument; where one of the instruments is an endoscope, cleaning of the endoscope; where one of the instruments is an endoscope, performing a white balance on the imaging system; where one of the instruments is an endoscope, the size or frequency of movement falls outside a range; and a change in the active instrument.

As described above, the status data may comprise information that describes the state of instruments attached to the robot arm(s). For example, the status data may comprise information identifying whether an instrument is attached to each of the arm(s), the type of instrument attached to each robot arm, and where the instrument is an energised instrument the status of the energised instrument (e.g. whether the instrument is energised or not and, optionally the waveform of the electrical current supplied to the energised instrument). In these cases, the control unit 510 may be configured to detect an instrument change event when the control unit 510 detects that an instrument was detached from a robot arm or if an instrument was attached to the arm. In these cases, the control unit 510 may be configured to detect a change in the status of the energised instrument when it detects from the status data that the status of the energised instrument changed from being energised to not being energised or vice versa, or when it detects that the waveform of the electrical current supplied to the energised instrument changes.

As described above, the status data may comprise information on the status of the endoscope, such as whether the endoscope in a cleaning state or whether the operator is performing a white balance on the imaging system. In these cases, the control unit 510 may be configured to determine that an instrument event has occurred if the control unit 510 detects from the endoscope status information that the endoscope was in an endoscope cleaning state or that the white balancing was performed on the imaging system. Where the status data does not comprise information on the status of the endoscope, the control unit 510 may be configured to automatically detect that the endoscope was in a cleaning state or that a white balance was performed on the imaging system from other status data. For example, the control unit 510 may be configured to detect that the endoscope was in a cleaning state or that a white balance was performed on the imaging system when the control unit 510: identifies a pattern of particular forces on the endoscope; identifies the position of the tip of the endoscope is outside the patient; identifies from a video of the operating theatre that the endoscope was cleaned, or white balancing was performed; and/or identifies a combination thereof.

As described above, the status data may comprise information on the position and/or movement of the endoscope. Where the endoscope is attached to a robot arm and controlled by an operator at the operator console the endoscope position and/or movement information may be generated, for example, by position and/or torque sensors on the robot arm. In these cases, the control unit may be configured to detect that an instrument event has occurred when it detects from the position and/or movement information that the size (i.e. magnitude) or frequency of the endoscope movement has fallen outside a range.

As described above, in some cases the surgical robot system 500 may comprise a plurality of surgical robots each of which may have an instrument attached thereto, and the operator (e.g. surgeon) may be able to selectively control one or more of the robot arms and the instruments attached thereto from the operator (e.g. surgeon) console. The operator may be able to select, via the operator console, which robot arms and thus which instruments are to be controlled by the operator by linking the input devices (e.g. hand controllers) to specific instruments. The instruments that are being controlled by the operator console at any one time may be referred to as the 'active' instruments. In these cases, the status data may comprise information that indicates which instruments are active (this may be referred to as the active instrument information). In these cases, the control unit 510 may be configured to detect that an instrument event has occurred when the control unit 510 detects from the active instrument information that one or more of the active instruments has changed.

In some cases, the control unit 510 may be configured to additionally, or alternatively, detect procedure events. Procedure events may include, for example, a change in the step or phase of the procedure being performed. For example, the procedure (e.g. surgery) may be associated with a predetermined set of steps, all or a portion of which may be performed during the procedure and the control unit 510 may be configured to detect that an event has occurred when it detects, from the status data, a change in the step, task or phase of the procedure that is being performed.

As described above, in some cases the status data may comprise information explicitly identifying which step of the procedure is currently being performed. For example, as described above, the operator (e.g. surgeon) or other user (e.g. other operating team member) may be able to manually indicate, during the procedure, which step of the procedure is currently being performed. In these cases, the control unit 510 may be able to identify a change in the step of the task from the step identifying information. Where information explicitly identifying the current step of the procedure is not received as part of the status data the control unit 510 may be configured to dynamically detect the steps of the task from other status data. For example, the control unit 510 may be configured to detect the steps of the procedure based on patterns detected in the status data that match patterns in the status data for previously performed tasks. In particular, the control unit 510, or another computing-based device, may be configured to analyse the status data related to previously performed procedures of the same type as the current procedure (e.g. status data related to the same surgical procedure or the same type of surgical procedure); identify a common set of steps in that task based on the analysis; and generate a map that links the identified steps. In some cases, the analysis may comprise at least analysing the endoscope video.

In other cases, the control unit 510, or another computing-based device, may be provided with the status data for one or more previously performed tasks which has been manually divided into segments associated with the steps of the task and the control unit 510, or other computing-based device, may identify characteristics or features of the status data associated with each step. For example, each step may be characterized by, for example, one or more of the following features: instrument type(s), robot arm movements and/or the hand controller movements. For example, the control unit 510, or other computing-based device, may be configured to receive status data of a previously performed task in which the segment of the status data corresponding to a suturing step is identified as such. The control unit 510, or other computing-based device may then analyse the portion of the status data identified as corresponding to a suturing step and identify features such as—a needle driver instrument being attached to two of the robot arms; the operator making repetitive small, curved motions with the hand controllers (and thus end effectors); and high forces being exerted on the end effector and the end effector jaws. The characteristics and/or features of a step can then be used to identify that step from the status data for a subsequent procedure. In some cases, the control unit 510, or other computing-based device, may be able to generate, from a single set of status data (i.e. status data relating to a single previously performed task) characteristics or features that sufficiently describe a task step so that it can be identified in another set of status data (i.e. status data related to another task). In other cases, the control unit 510, or other computing-based device, may require multiple sets of status data to generate characteristics or features that sufficiently describe a task step so that it can be identified in another set of status data.

An example set of steps for a robot-assisted surgical procedure which may be automatically detectable by the control unit 510 is shown in Table 1. A robot-assisted surgical procedure may include all, or only a portion of (i.e. a subset of) these steps.

TABLE 1

Task Steps

Trocar insertion
Instrument insertion
Moving organs/tissue out of the way
Tissue dissention
Arrival at target organ
Isolation of blood supply
Transection of organ
Anastomosis/organ closure
Specimen retrieval
Haemostasis
Target closure/proximation
Instrument removal
Trocar/port removal
Wound closure In many cases, each task has a predefined set of steps which may be performed during the task and there only a few possible combinations of the steps which may occur. In these cases, once the control unit 510 has detected a particular step there are typically a fairly limited number of steps that can occur after that step. This may ease the burden on the control unit 510 in detecting the steps of the task. It may also allow the control unit 510 to detect when there has been a deviation from the expected set of steps (e.g. when a step not in the list of expected steps is performed, or when a step in the list of expected steps is performed out of order).

In some cases, the control unit 510 may be configured to additionally, or alternatively, detect image events. Image events may comprise the detection of an object or feature in the image data captured by an image capture device, such as an endoscope. Detecting image data may comprise analysing the captured image data to identify, using image analysis techniques, predetermined objects and features. The predetermined objects may include things such as, but not limited to, body parts or organs (e.g. gallbladder, heart, lung etc.); a tissue type; or a distance between objects in the image data such as the distance between an instrument and a body part or organ.

It will be evident to a person of skill in the art that this is an example set of events that the control unit 510 may be capable of detecting and that in other examples the control unit 510 may be configured to detect additional events, only a subset of events or different events.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A surgical robot system comprising:
a surgical robot, the surgical robot comprising a base, and an arm extending from the base to an attachment for an instrument, the arm comprising a plurality of joints whereby the configuration of the arm can be altered;
an instrument attached to the arm of the surgical robot;
memory configured to store a library of control parameters for an operator of the surgical robot, the library of control parameters for the operator comprising a plurality of sets of control parameters for the instrument; and
a control unit configured to:
receive one or more inputs from the operator of the surgical robot in relation to movement of the instrument and translate the one or more inputs into one or more control signals in accordance with a set of control parameters of the plurality of sets of control parameters to control the movement of the instrument,
receive status data indicating a status of the surgical robot system during a procedure;
detect events from patterns in the status data in real-time; and
in response to detecting one of a plurality of events or combinations of events, automatically select a different set of control parameters of the plurality of sets of parameters associated with the detected event;
wherein each set of control parameters for an instrument defines a relationship between the operator inputs in relation to movement of the instrument and movement of the instrument.

2. The surgical robot system of claim 1, wherein the control unit is further configured to receive input from the operator identifying the set of control parameters.

3. The surgical robot system of either claim 1 or claim 2, wherein the control unit is further configured to receive input from the operator which causes the control unit to adjust one or more control parameters of the set of control parameters.

4. The surgical robot system of claim 1, wherein at least one of the plurality of events or combinations of events comprises a particular phase of the procedure.

5. The surgical robot system of claim 1, wherein the status data comprises one of more of instrument data indicating a status of the instrument; torque information indicating a torque applied to the surgical robot; position information indication a position of the surgical robot arm; and a video stream of a surgical site captured by an endoscope.

6. The surgical robot system of claim 1, wherein the instrument is an energised instrument and the control unit is further configured to, in response to receiving an input from the operator to energise the energised instrument, cause a driving energised signal to be provided to the energised instrument that conforms to a set of energising control parameters, the set of energising control parameters being one of one or more sets of energising control parameters associated with the operator.

7. The surgical robot system of claim 6, wherein the energised instrument is an electrosurgical instrument.

8. The surgical robot system of claim 6, wherein the set of energising control parameters comprises one or more of:

power output as a fraction of load resistance, maximum power output, high frequency voltage form, peak voltage, frequency and duty cycle.

9. The surgical robot system of claim 1, wherein the control unit is configured to provide a visual indication to the operator of the set of control parameters used to translate the operator inputs.

10. The surgical robot system of claim 9, wherein the visual indication is provided to the operator on a display used to display a representation of a video stream of a surgical site.

11. The surgical robot system of claim 1, wherein the set of control parameters comprises: one or more instrument speed parameters, one or more instrument applied force parameters, and/or one or more instrument wrist motion gain parameters.

12. The surgical robot system of claim 1, further comprising an operator console comprising one or more input devices by which a user can provide the inputs to the control unit.

13. The surgical robot system of claim 1, further comprising a graphical user interface configured to allow the operator to modify a set of control parameters associated with the operator.

14. The surgical robot system of claim 13, wherein the graphical user interface is configured to allow the operator to modify the set of control parameters during a procedure.

15. The surgical robot system of claim 13, wherein the graphical user interface is further configured to allow the operator to add a set of control parameters to the one or more sets of parameters associated with the operator.

16. The surgical robot system of claim 15, wherein the added set of control parameters was generated by a different operator.

17. The surgical robot system of claim 13, wherein the graphical user interface is configured to allow the operator to select the set of control parameters.

18. A surgical robot system comprising:
a surgical robot, the surgical robot comprising a base, and an arm extending from the base to an attachment for an instrument, the arm comprising a plurality of joints whereby the configuration of the arm can be altered;
an energised instrument attached to the arm of the surgical robot; and
a control unit configured to:
receive one or more inputs from an operator of the surgical robot in relation to movement of the energised instrument and translate the one or more inputs into one or more control signals in accordance with a set of control parameters to control the movement of the energised instrument;
detect energised events in real-time from status data indicating a status of the surgical robot system during a procedure; and
in response to detecting one of a plurality of predetermined energised events, automatically adjust at least one control parameter of the set of control parameters;
wherein the set of control parameters comprises one or more velocity limit parameters and control unit is configured to, in response to detecting energisation of the energised instrument, automatically adjust at least one of the one or more velocity limit parameters so as to minimize velocity of the energised instrument.

19. The surgical robot system of claim 18, wherein the energised instrument is an electrosurgical instrument.

20. The surgical robot system of claim 19, wherein the electrosurgical instrument is an electrosurgical instrument comprising one or more grasping elements.

21. The surgical robot system of claim 20, wherein the electrosurgical instrument is a cut and seal electrosurgical instrument.

22. The surgical robot system of either claim 20 or claim 21, wherein the set of control parameters control a grasping force of the one or more grasping elements of the electrosurgical instrument and the control unit is configured to, in response to detecting energisation of the electrosurgical instrument, automatically adjust at least one control parameter of the set of control parameters so that an optimum grasping force is applied to the one or more grasping elements of the electrosurgical instrument.

23. The surgical robot system of claim 22, wherein the control unit is configured to determine the optimum grasping force based on one or more of: a type of tissue energy is being applied to; and a type of procedure being performed on the tissue.

24. The surgical robot system of claim 20, wherein the control unit is configured to, in response to detecting one of the plurality of predetermined energised events, automatically adjust at least one control parameter of the set of control parameters that controls axial movement of the one or more grasping elements.

25. The surgical robot system of claim 24, wherein the control unit is configured to, in response to detecting energisation of the electrosurgical instrument, automatically adjust at least one control parameter of the set of control parameters to limit the axial movement of the one or more grasping elements.

26. The surgical robot system of claim 25, wherein the control unit is configured to detect an energising event of the plurality of predetermined energised events when the control unit detects from the status data one of a plurality of predetermined combinations of one or more energising conditions, an energising condition being a condition that affects an energised action performed by the energised instrument.

27. The surgical robot system of claim 26, wherein the one or more energising conditions comprises one or more of: energising the energised instrument; a type of energised action or task being performed; a type of tissue on which an energised action is being performed; impedance that tissue on which the energised action is being performed provides to electrical current flowing through it; conductance of tissue on which an energised action is being performed; an amount of energy applied to the tissue over time; a duty cycle of a driving energised signal provided to the energised instrument; peak voltage of the driving energised signal; and a frequency of the driving energised signal.

28. The surgical robot system of claim 27, wherein the control unit is configured to detect one or more of the one or more energising conditions by monitoring one or more of the driving energised signal provided to the energised instrument and a return energised signal.

29. The surgical robot system of claim 28, wherein the control unit is configured to detect one or more of the impedance and the conductance of the tissue by monitoring the return energised signal.

30. The surgical robot system of claim 29, wherein the control unit is further configured to adjust at least one control parameter of the set of control parameters so that a grasping force applied to the one or more grasping elements of the electrosurgical instrument changes as the impedance and/or conductance of the tissue changes.

31. The surgical robot system of claim 18, wherein the control unit is configured to:
- in response to detecting energisation of the energised instrument, automatically adjust the at least one control parameter of the set of control parameters; and
- in response to detecting that the energised instrument is no longer energised, automatically revert back to using the set of control parameters.

32. The surgical robot system of claim 18, wherein the control unit is further configured to, in response to receiving an input from the operator to energise the energised instrument, cause a driving energised signal to be provided the energised instrument that conforms to a set of energising control parameters, the set of energising control parameters being one of one or more sets of energising control parameters associated with the operator.

33. The surgical robot system of claim 32, wherein the set of control parameters is one of one or more sets of control parameters associated with the operator.

\* \* \* \* \*